United States Patent [19]

Rubin

[11] Patent Number: 5,199,927
[45] Date of Patent: Apr. 6, 1993

[54] BENT SHANK NUT TAPPING METHOD AND APPARATUS

[76] Inventor: Shlomo Z. Rubin, 1845 Warrensville Center Rd., South Euclid, Ohio 44121

[21] Appl. No.: 821,156

[22] Filed: Jan. 15, 1992

[51] Int. Cl.$^5$ .................................................. B21D 53/24
[52] U.S. Cl. .................................... 470/98; 470/18; 470/167
[58] Field of Search ............... 470/98, 101, 109, 96, 470/95, 18, 165, 167

[56] References Cited

U.S. PATENT DOCUMENTS

| | | | |
|---|---|---|---|
| 2,115,452 | 4/1938 | Awig | 470/101 |
| 2,115,599 | 4/1938 | Werner et al. | 470/101 |
| 2,130,348 | 9/1938 | Knettle . | |
| 2,141,280 | 11/1938 | Selman . | |
| 2,242,487 | 5/1941 | Swanson | 90/14 |
| 2,356,100 | 8/1944 | Tangowski . | |
| 2,527,480 | 10/1950 | Hucal . | |
| 3,056,983 | 10/1962 | Devereux et al. . | |
| 3,233,259 | 2/1966 | MacLean, III et al. . | |
| 3,348,248 | 10/1967 | Milkert . | |
| 3,422,944 | 1/1969 | Couillais | 193/1 |
| 3,510,896 | 5/1970 | von den Steinen . | |
| 3,571,834 | 3/1971 | Mathias . | |
| 3,858,299 | 1/1975 | Woods | 29/211 |
| 4,025,219 | 5/1977 | Baumann et al. | 408/29 |
| 4,229,126 | 10/1980 | Harrow | 408/63 |
| 4,299,001 | 11/1981 | Cleary . | |
| 4,476,599 | 10/1984 | Steward et al. . | |

FOREIGN PATENT DOCUMENTS 561480 5/1944 United Kingdom .

*Primary Examiner*—Lowell A. Larson
*Assistant Examiner*—Michael J. McKeon
*Attorney, Agent, or Firm*—Renner, Otto, Boisselle & Sklar

[57] ABSTRACT

A machine and method for continuous thread tapping of threads in fasteners such as nut blanks or the like having a fastener blank advancement mechanism incorporated into a fastener blank holding and guidance assembly. A continuous stream of fastener blanks are fed into and securely held and advanced onto a tap by a modular worm jaw assembly. Fastener blanks are continuously fed into the worm jaw assembly so that a continuous progression of blanks are advanced onto the tap by forward turning of worms rotating within laterally opposed jaws which hold the fastener blanks and prevent them from rotating as they are advanced over the rotating tap. Once the nut blank is advanced over the tap, it is pushed by a progression of successive nuts along the length of the shank which supports the tap to the end of the shank opposite the tap die from which the tapped nuts drop into a receptacle. The worm jaw assembly is of modular construction to facilitate easy removal and replacement. The worm jaw assembly is positioned upon laterally screw adjustable gibs to allow lateral adjustment of opposing worm jaws to accommodate fasteners of various sizes. The shank and a sleeve which supports the nuts as they progress along the length of the shank beyond the tap are encased in a hinged assembly to allow easy access to the shank, tap and sleeve for removal and replacement. The rate of rotation of the tap relative to the rate of rotation of the worm jaw advancement assembly is synchronized to insure that the nuts are tapped at the correct pitch.

34 Claims, 9 Drawing Sheets

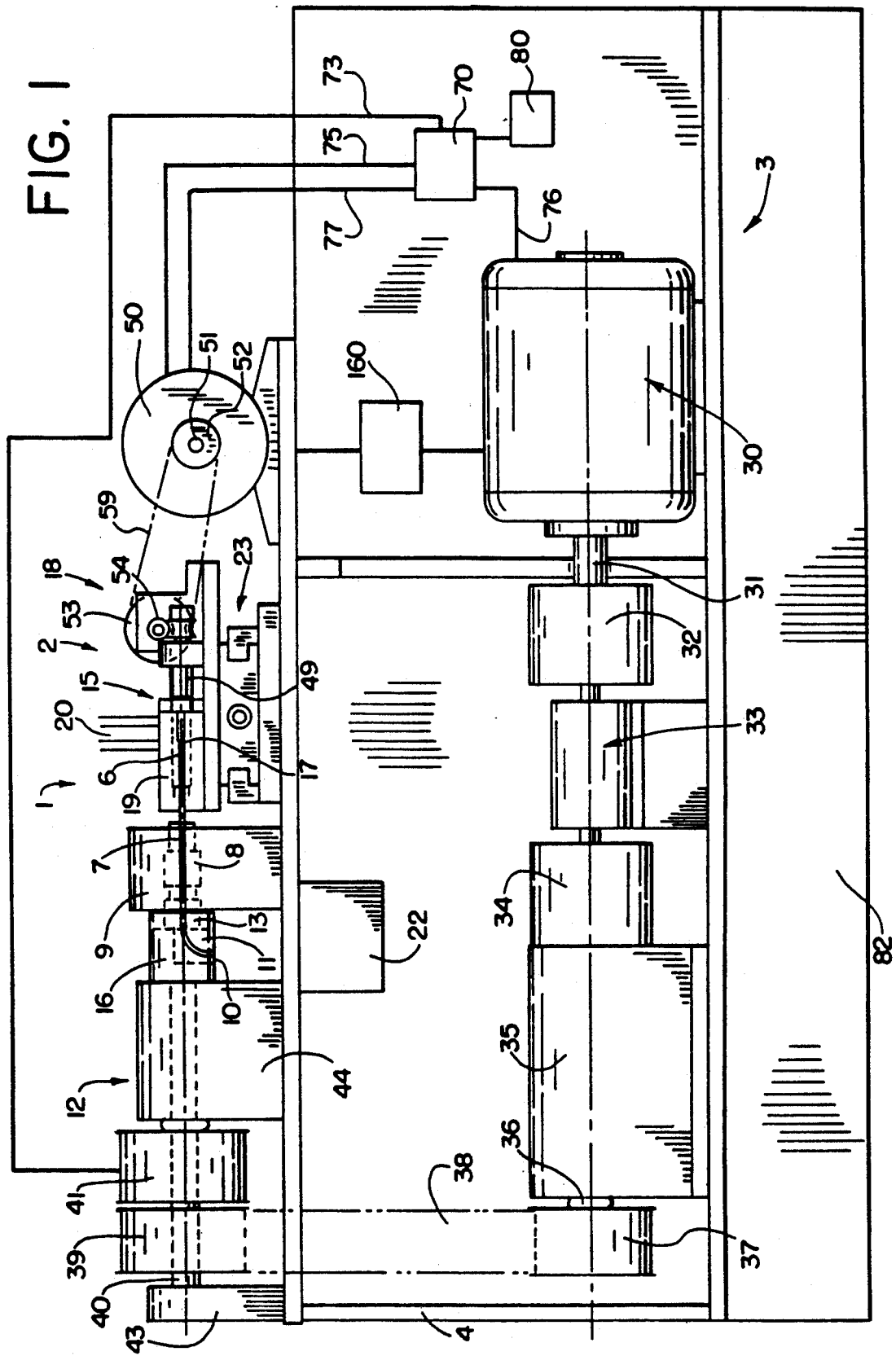
FIG. I

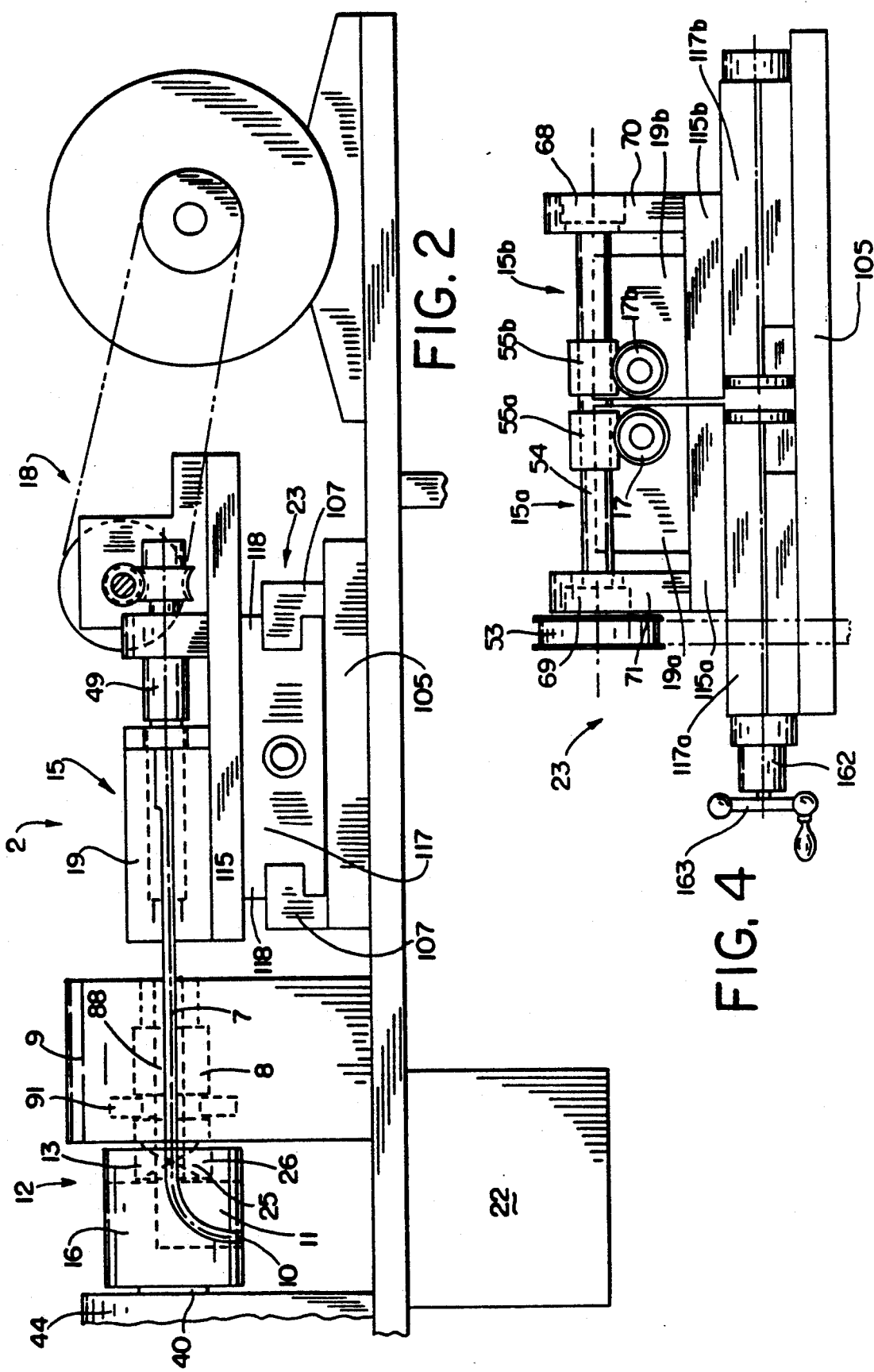

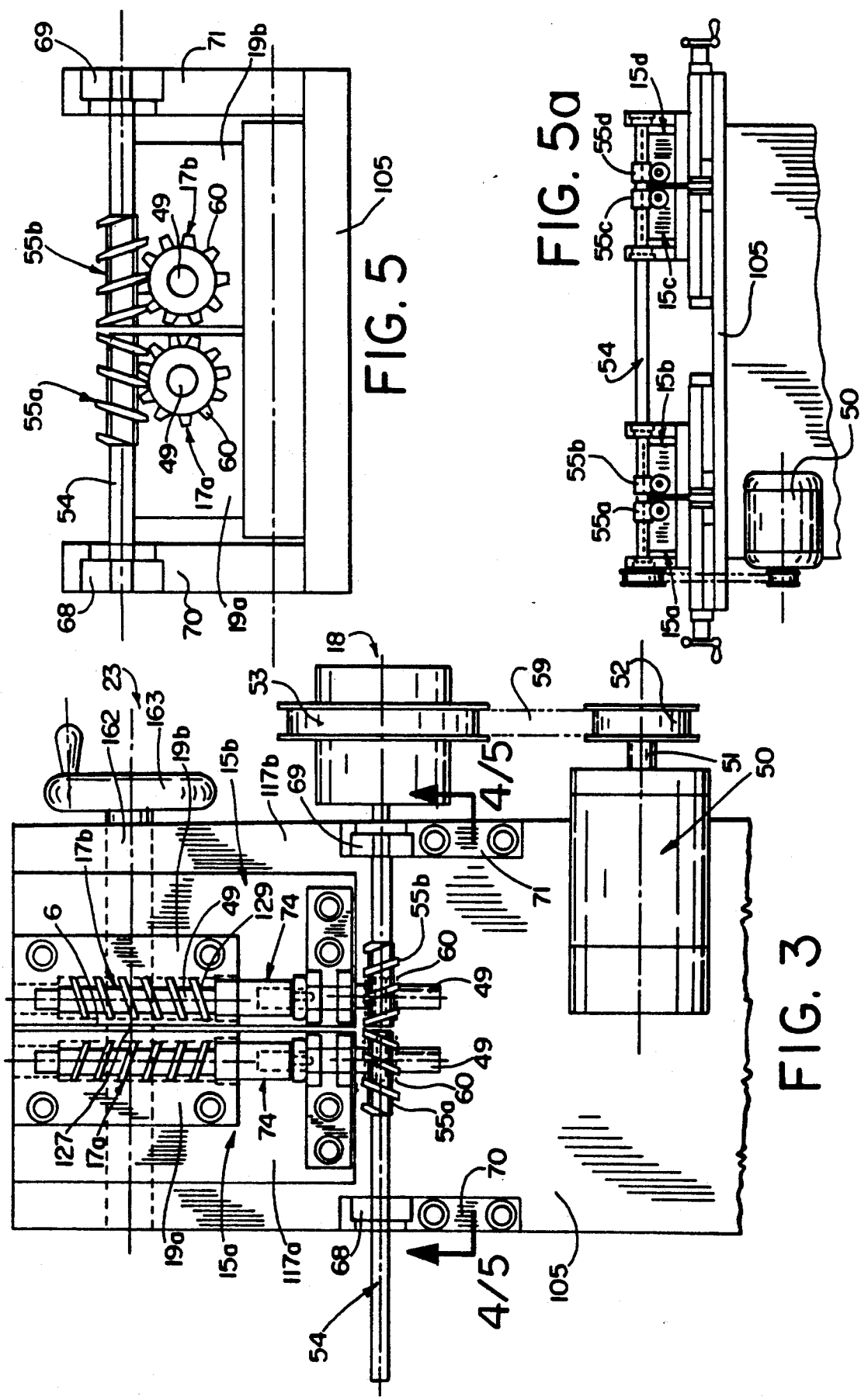

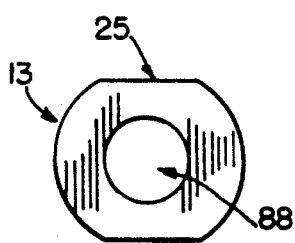
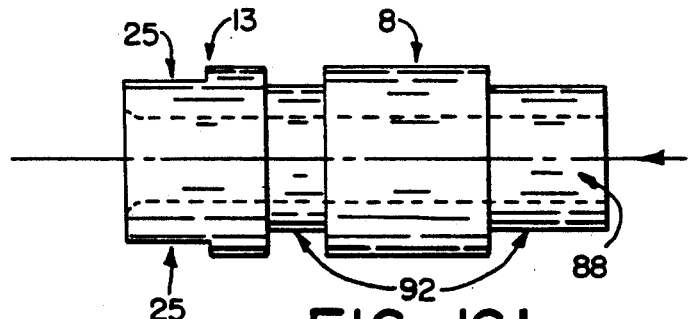
FIG. 16a    FIG. 16b
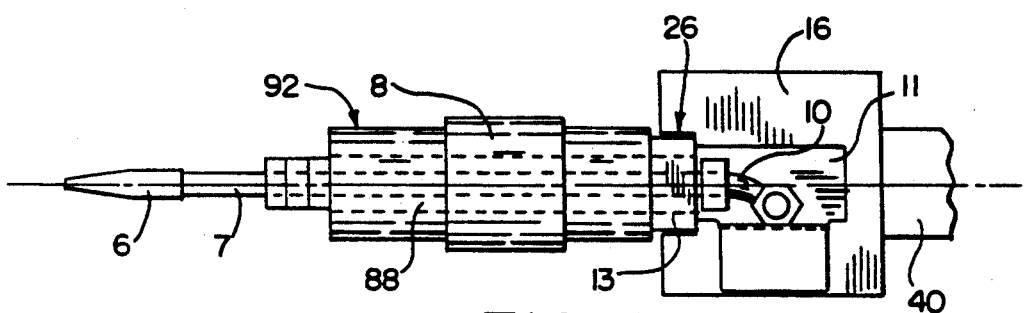
FIG. 17a
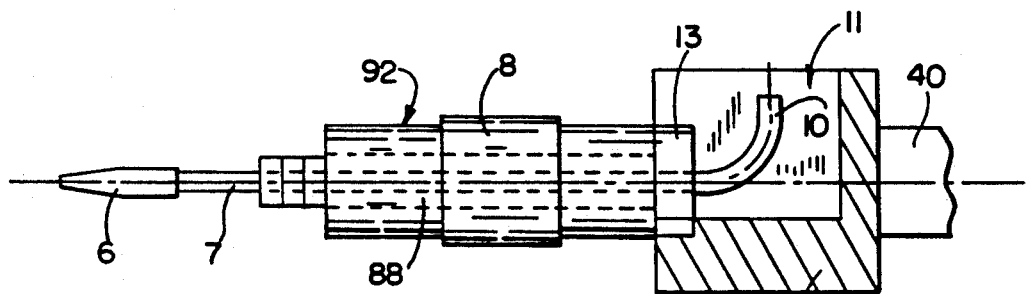
FIG. 17b
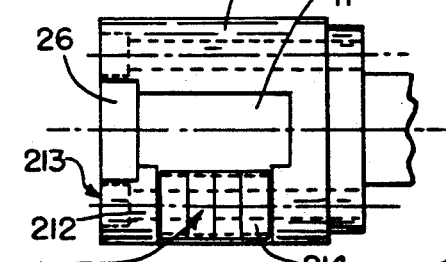
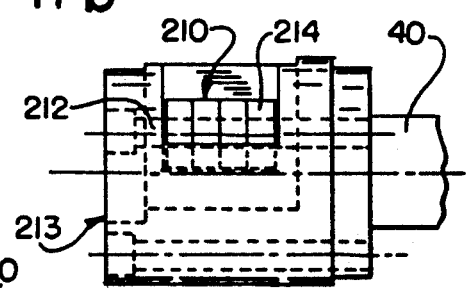
FIG. 18a    FIG. 18b
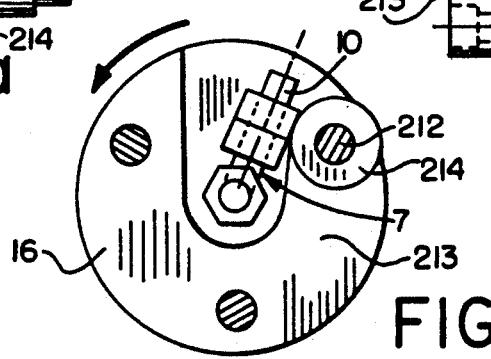
FIG. 18c

BENT SHANK NUT TAPPING METHOD AND APPARATUS

TECHNICAL FIELD

The present invention relates generally, as is indicated, to a method and apparatus for cutting or tapping threads into fasteners such as nuts or the like.

More particularly, the present invention relates to a bent shank nut tapping method and apparatus in which nut or fastener blanks are continuously advanced onto a tap at one end of the rotating shank and along the tap and shank for discharge at the other end of the shank.

Exemplary features of the invention, which is described in detail below, include a combined advancement and gripping assembly of modular construction using plural worms, lateral screw-adjustable capability for such assembly to accommodate nut or fastener blanks of various shapes and/or sizes, a hinged shank sleeve encasement assembly to facilitate access to the shank and the tap, and synchronizing of the rate at which nut or fastener blanks are advanced onto and over the tap relative to the rate of rotation of the tap. Additional features of the invention will become apparent upon reading the specification.

BACKGROUND OF INVENTION

Nuts or fasteners or other objects having internal threads are commonly produced through the use of a rotating tap which cuts a spiral thread pattern into a wall of an axial bore in the object to be tapped. In conventional or prior machines designed to mass produce nuts or other types of threaded fasteners, the tap typically is attached to one end of a shank. (The terms nuts, fasteners, blanks, workpiece, etc. may be used substantially equivalently herein and are considered equivalents with respect to tapping thereof according to the disclosed and claimed invention.) The opposite end of the shank is bent or offset from the length of the shank to provide a torque arm for engagement with a tap driver to rotate the shank and the tap. The shank and tap are rotated at a constant speed by a tap driver. The axial bore of a nut or fastener blank is aligned with the linear axis of the tap and shank and the nut or fastener blank is pushed onto and over the tap by a pusher or other advancement mechanism. The rotating tap cuts a spiral thread pattern into the advancing nut blank bore. Such machines are in essence two machines, the tap driver for providing a rotating tap and the nut or fastener blank pusher, both working in conjunction to produce an object with internal threads.

Such machines often are referred to as nut tapping machines, fastener tapping machines or by similar names.

After the axial bore of the fastener blank is tapped by the cutting threads of the tap, the newly tapped fastener remains on the shank. The tapped fastener is then pushed along the length of the shank away from the tap by the progression of successive nuts which are similarly tapped and pushed along the rotating tap and are held within a cylindrical sleeve positioned about the straight portion of the shank. As the tapped nuts or tapped fasteners (also referred to herein as threaded nuts or fasteners) ultimately arrive at the bent end of the shank, fasteners drop off the bent end into a receptacle or other type of receiving system.

U.S. Pat. No. 3,510,896 discloses such an exemplary conventional tapping machine having a bent shank supporting a tap used for cutting threads into nuts. The tapped nuts fall off the bent end of the shank into a collecting housing as is described herein. U.S. Pat. No. 4,229,126 discloses another conventional machine for tapping nuts with a pusher which pushes the nut blanks onto the tap and along the shank.

There are many problems associated with the existing machines and methods employed in the above described tapping operation. One principal problem involves the fastener pusher for holding and advancing the fastener blanks also referred to as workpieces as they are brought into contact with and along the rotating tap. In a typical tapping machine employing a pusher, the bore of a single fastener blank is positioned or otherwise aligned with the rotational axis of the rotating tap and shank. The pusher pushes the blank onto and along the rotating tap and continues to push the blank until it has completely passed over the cutting teeth of the tap. The pusher thereafter must retract fully away from the tap to allow a subsequent fastener blank to be put into position and/or to be aligned in front of the tap for subsequent tapping. During the time necessary to allow the pusher fully to retract, the tap and shank continue to rotate despite the fact that no tapping is taking place.

Thus, such an existing machine is engaged in an actual tapping process only a fraction of the time it is operating and, in fact, is operating at a much lower efficiency than it would otherwise operate if fasteners were being tapped substantially continuously without having to wait for the pusher to retract after each piece is tapped. The productivity of such machines is seriously limited due to such inefficiency. To compensate for this limitation, such machines frequently are run at speeds in excess of the designed parameters thereof, often more than twice as fast as the designed maximum speed. This results in excessive and premature wear of all of the components of the machine, especially the tap. Such component(s) therefore have to be replaced more frequently, and during such servicing of the machine further production time is lost. The cost of replacement parts and of lost productivity time increases the cost of operating the machine and, or course, the cost of the parts produced.

The present invention provides a method and apparatus for continuously advancing a series of nut or fastener blanks (or other equivalent or similar workpieces) onto a rotating tap so that the tap is continuously or substantially continuously engaged in a tapping process throughout the period of operation of the machine.

Another problem with existing fastener tapping machines involves the apparatus by which fastener blanks are securely and accurately held in position as they come into contact with the rotating tap. This has heretofore been accomplished through the use of individual block guides which, if correctly aligned, guide the blank onto the tap and prevent the blank from rotating as it is being tapped. Typically, the individual block guides would have to be adjusted manually so as to be aligned properly with the tap. This often involves relying on the visual alignment of the block guides and tap. Accordingly, the adjustment of such guides requires a great deal of time and labor, further reducing the productivity of such machines. As a result, substantial set-up time is required to provide proper alignment. Moreover, each time the machine tooling is changed, for example, to change taps or to accommodate different size nuts or other types of fasteners, the alignment procedure must be repeated, resulting in additional production losses.

The present invention overcomes such shortcomings found in existing machines by providing a modular fastener blank holding and guidance apparatus which is combined with a continuous nut blank advancement means. The combination of the fastener blank advancement apparatus with the holding and guidance means in the form of a modular unit simplifies the adjustment, alignment construction, operation, maintenance and retooling of the machine as described below.

Another problem associated with existing fastener tapping machines involves the difficulty of changing, when desired, the machine tooling such as the tap and the shank. In the operation and maintenance of such machines, it is necessary on a regular basis, for example, at the end of a production run, to remove from the machine the shank which supports the tap. The shank is removed to permit the tap to be changed and to remove the nuts which remain along the length of the shank at the end of a production run. In the past, to remove the shank it has first been necessary to disengage the bent end of the shank from the tap driver used to rotate the shank. This typically requires that the tap driver, usually a large and massive assembly, first be moved relative to the shank, rather than the shank being removed from the tap driver. After the tap driver is moved enough to provide adequate clearance the shank is then pulled along its longitudinal axis from a bearing housing which supports the shank. Removal of the shank in this manner is extremely difficult and time consuming, particularly after a long production run resulting in heat induced expansion and binding of the close tolerance parts. Also, the tapped fasteners which remain about the length of the shank at the end of a production run tend to complicate removal of the shank. The entire procedure requires a great deal of time and labor, further reducing the efficiency and productivity of the machine. Furthermore, a relatively large space is required surrounding the machine to provide space for the displaced tap driver and to provide clearance to withdraw the shank axially from its bearing housing.

The present invention, provides for convenient removal of the shank without having to displace the tap driver away from the shank. Moreover, the present invention further provides an improved shank mounting and bearing structure that provides secure support for the shank. The mounting and bearing structure permits unobstructed rotation of the shank and provides protected guidance for the fasteners as they move along the length of the shank.

Still another problem associated with existing fastener tapping machines involves the manner in which the rate of rotation of the tap is synchronized with the rate of advancement of the fastener blanks. In order to achieve tapped threads of the correct pitch, the rate of rotation of the tap must be synchronized with the rate at which the fastener blanks are advanced as will be appreciated. Typically, in existing machines, such synchronization is accomplished by the individual adjustment of the tap driver speed relative to the advancement rate of the fastener blank pusher. This adjustment typically requires physically changing cams and/or gears which actually drive the tap driver and pusher. Such method of synchronization is often by trail and error and is burdensome, time consuming and difficult.

The present invention provides an improvement for obtaining such synchronization by way of an electrical control circuit which electrically links the tap driver with the fastener blank advancement mechanism so that the two remain in proper synchronization.

Another problem associated with the existing nut and fastener tapping machines occurs in the slot of the tap driver which receives and engages the bent end of the shank to effect to power rotation of the shank and tap. As tapped fasteners reach the bent end of the shank inside the tap driver and are forced off the bent end of the shank, the fasteners come in direct contact with the interior walls of the slot in the tap driver head. This repeated and continuous contact of the fasteners with the tap driver slot rotating at high velocity rather quickly results in excessive wear and deterioration and deformation of the shape of the slot of the tap driver. The flat walls which define the slot in the tap driver are quickly abraded to the point where the formation of the slot is substantially deformed. A tap driver with a deformed slot does not provide accurate engagement and rotation of the tap to continuously produce tap fasteners of consistent acceptable quality.

The present invention provides an improvement for overcoming rapid and excessive abrasion and deformation of the slot in the tap driver by providing a roller mechanism at the top edge of the exiting side wall of the slot. Tapped fasteners which reach the bent end of the shank touch only the roller mechanism incorporated into the interior of the slop in the tap driver to eliminate friction and abrasion of the tap driver by the fasteners.

As will be appreciated, the present invention overcomes the aforementioned shortcomings of known fastener tapping machines and provides an apparatus and method for continuous and uninterrupted tapping of blank fasteners as are summarized and described in detail below.

SUMMARY

In accordance with the present invention, there is provided a bent shank or other fastener nut tapping apparatus and method. Fastener blanks continuously are advanced onto a rotating tap without having to retract the advancement mechanism after each fastener has been tapped. The advancement mechanism for advancing the fastener blanks is modular in its construction and facilitates adjusting the apparatus for different types or sizes of fasteners, for repairing or replacing worn tooling, etc. The tapping apparatus includes a hinged assembly which allows the bent end shank and tap to be removed from the apparatus without having to displace the tap driver. Accurate synchronization of the tap rotation and the advancement mechanism is provided electrically using feedback control. A roller assembly incorporated into the tap driver eliminates friction and abrasion of the slot in the tap driver caused by the existing fasteners.

According to one particular aspect of the present invention, a machine for cutting internal threads into an axial bore of continuous series of workpieces without interruption between workpieces is provided. The machine includes a tap, axially aligned with and attached to an end of a shank. An opposite end of the shank is bent and removably engaged with a tap driver. A mechanism for continuous advancement of workpiece blanks onto the rotating tap is incorporated into and journalled to rotate within symmetrical laterally opposed jaws which grip, align, and prevent rotation of the workpieces as they are advanced onto the rotating tap.

According to another particular aspect of the invention, a machine for cutting threads into the internal axial bore of a continuous series of workpieces is provided having a rotating tap attached to one end of a shank, an opposite end of the shank bent and removably engaged with a tap driver, symmetrical laterally opposed gripping jaws which overlap the tap and hold the workpieces, align the axial bore of the workpieces with the linear axis of the tap and shank, and prevent rotation of the workpieces as they are advanced onto the rotating tap, worms incorporated into and journalled to rotate within the jaws to advance the workpieces through the jaws, and a sleeve with a cylindrical axial bore positioned about a straight length portion of the shank and engaged with the tap driver to rotate in unison with the tap and shank and to support the tapped workpieces and shank.

According to still another particular aspect of the invention, the worms incorporated into and journalled to rotate within the jaws form a modular removable interchangeable unit.

According to still another particular aspect of the invention the sleeve positioned about the straight length portion of the shank is encased in an operable assembly which includes support rollers to support the sleeve.

According to still another particular aspect of the invention, there is provided a system for electronically monitoring and synchronizing the rates of rotation of the shank and tap and the worms within the jaws.

According to still another particular aspect of the invention, there is provided a threaded lead screw assembly underneath the jaws to provide opposed lateral adjustment of the symmetrical laterally opposed jaws and worms within.

According to still another particular aspect of the invention there is provided a roller in the interior of the tap driver head which engages the bent end of the shank to eliminate friction between tapped workpieces exiting the bent end of the shank through the head of the tap driver.

According to still another particular aspect of the invention there is provided a pusher which extends into the interior of the tap driver head which engages the bent end of the shank to push the bent end of the shank away from the back wall of the interior of the tap driver head to avoid contact of workpieces exiting the bent end of the shank with the back wall of the interior of the tap driver head.

According to an aspect of the invention a machine for cutting internal threads into an axial bore of a continuous series of workpieces without interruption between workpieces includes a tap axially aligned with and attached to an end of a shank, an opposite end of the shank being bent and removably engaged with a tap driver, a continuous advancement mechanism parallel laterally aligned with the tap and incorporated into and journalled to rotate within symmetrical laterally opposed workpiece gripping mechanism, the advancement and gripping mechanism being positioned to overlap the tap continuously to advance the workpieces onto the tap and shank, a mechanism to rotate the tap driver, and a mechanism to rotate the advancement mechanism within the gripping mechanism.

According to another aspect a machine for cutting internal threads into an axial bore of a continuous series of workpieces without interruption between workpieces includes a tap axially aligned with and attached to an end of a shank, an opposite end of the shank being bent and removably engaged with a tap driver, means to rotate the tap driver, continuous advancement means parallel laterally aligned with the tap and incorporated into and journalled to rotate within symmetrical laterally opposed workpiece gripping means, the gripping means positioned to overlap the tap continuously to advance the workpieces onto the tap, means to rotate the advancement means within the gripping means, and a sleeve positioned about a straight length portion of the shank between the tap and the bent end of the shank, the sleeve having an axial cylindrical bore of the diameter sufficient to accommodate the external dimensions of the workpiece.

According to a further aspect, a machine for cutting internal threads into an axial bore of a continuous series of workpieces without interruption between workpieces includes a tap axially aligned with and attached to an end of a shank, an opposite end of the shank being bent and removably engaged with a tap driver, means to rotate the tap driver, continuous advancement means parallel laterally aligned with the tap and incorporated into and journalled to rotate within symmetrical laterally opposed workpiece gripping means, the gripping means positioned to overlap the tap continuosly to advance the workpieces onto the tap, the gripping and advancement means being of modular construction in a single removable interchangeable unit, means to rotate the advancement means within the gripping means, and a sleeve positioned about a straight length portion of the shank between the tap and the bent end of the shank, the sleeve having an axial cylindrical bore of internal diameter sufficient to accommodate the external dimensions of the workpiece, the end of the sleeve opposite the tap engaged with the tap driver so that the sleeve is rotated in unison with the tap.

According to an additional aspect, a machine for cutting internal threads into an axial bore of a continuous series of workpieces without interruption between workpieces includes a tap axially aligned with and attached to an end of a shank, an opposite end of the shank being bent and removably engaged with a tap driver, means to rotate the tap driver, continuous advancement means parallel laterally aligned with the tap and incorporated into and journalled to rotate within symmetrical laterally opposed workpiece gripping means, the gripping means positioned to overlap the tap continuously to advance the workpieces onto the tap, the gripping and advancement means being of modular construction in a single removable interchangeable unit, means to rotate the advancement means within the gripping means, and a sleeve positioned about a straight length portion of the shank between the tap and the bent end of the shank, the sleeve having an axial cylindrical bore of internal diameter sufficient to accommodate the external dimensions of the workpiece, the end of the sleeve opposite the tap engaged with the tap driver so that the sleeve is rotated in unison with the tap, and means to synchronize the rate of rotation of the tap driver with the rate of rotation of the advancement means within the gripping means.

According to yet another aspect, a machine for cutting internal threads into an axial bore of a continuous series of workpieces without interruption between workpieces comprising, in combination, a tap axially aligned with and attached to an end of a shank, an opposite end of the shank being bent and removably engaged with a tap driver, means to rotate the tap driver, continuous advancement means parallel laterally aligned with the tap and incorporated into and journalled to rotate within symmetrical laterally opposed workpiece gripping means, the gripping means positioned to overlap the tap continuously to advance the workpieces onto the tap, the gripping and advancement means being of modular construction in a single removable interchangeable unit, means to rotate the advancement means within the gripping means, and a sleeve positioned about a straight length portion of the shank between the tap and the bent end of the shank, the sleeve having an axial cylindrical bore of internal diameter sufficient to accommodate the external dimensions of the workpiece, the end of the sleeve opposite the tap engaged with the tap driver so that the sleeve is rotated in unison with the tap, the sleeve and the portion of the shank inside the cylindrical bore of the sleeve removably positioned and journalled to rotate within an openable encasement, and means to synchronize the rate of rotation of the tap driver with the rate of rotation of the advancement means within the gripping means.

According to yet a further aspect, a machine for cutting internal threads into an axial bore of a continuous series of workpieces without interruption between workpieces comprising, in combination, a tap axially aligned with and attached to an end of a shank, an opposite end of the shank being bent and removably engaged with a tap driver, means to rotate the tap driver, continuous advancement means parallel laterally aligned with the tap and incorporated into and journalled to rotate within symmetrical laterally opposed workpiece gripping means, the gripping means positioned to overlap the tap continuously to advance the workpieces onto the tap, means to laterally adjust the symmetrical laterally opposed workpiece gripping means and the advancement means incorporated within the workpiece gripping means relative to the shank end tap, the gripping and advancement means being of modular construction in a single removable interchangeable unit, means to rotate the advancement means within the gripping means, and a sleeve positioned about a straight length portion of the shank between the tap and the bent end of the shank, the sleeve having an axial cylindrical bore of internal diameter sufficient to accommodate the external dimensions of the workpiece, the end of the sleeve opposite the tap engaged with the tap driver so that the sleeve is rotated in unison with the tap, the sleeve and portion of the shank inside the cylindrical bore of the sleeve removably positioned and journalled to rotate within an openable encasement, and means to synchronize the rate of rotation of the tap driver with the rate of rotation of the advancement means within the gripping means.

According to yet an additional aspect, a machine for cutting internal threads into an axial bore of a continuous series of workpieces without interruption between workpieces comprising, in combination, a tap axially aligned with and attached to an end of a shank, an opposite end of the shank being bent and removably engaged in a slot in a head of a tap driver, the slot having roller means at the point of contact of the bent end of the shank with a surface wall of the slot, means to rotate the tap driver, continuous advancement means parallel laterally aligned with the tap and incorporated into and journalled to rotate within symmetrical laterally opposed workpiece gripping means, the gripping means positioned to overlap the tap continuously to advance the workpieces onto the tap, means to laterally adjust the symmetrical laterally opposed workpiece gripping means and the advancement means incorporated within the workpiece gripping means relative to the shank end tap, the gripping and advancement means being of modular construction in a single removable interchangeable unit, means to rotate the advancement means within the gripping means by a single drive shaft, and a sleeve positioned about a straight length portion of the shank between the tap and the bent end of the shank, the sleeve having an axial cylindrical bore of internal diameter sufficient to accommodate the external dimensions of the workpiece, the end of the sleeve opposite the tap engaged with the tap driver so that the sleeve is rotated in unison with the tap, the sleeve and the portion of the shank inside the cylindrical bore of the sleeve removably positioned and journalled to rotate within an openable encasement, and means to synchronize the rate of rotation of the tap driver with the rate of rotation of the advancement means within the gripping means.

According to even another aspect, a machine for cutting internal threads into an axial bore of a continuous series of workpieces without interruption between workpieces comprising, in combination, a tap axially aligned with and attached to an end of a shank, an opposite end of the shank being bent and removably engaged in a slot in a head of a tap driver, the slot having roller means at the point of contact of the bent end of the shank with a surface wall of the slot, means to rotate the tap driver, continuous advancement means parallel laterally aligned with the tap and incorporated into and journalled to rotate within symmetrical laterally opposed workpiece gripping means, the gripping means positioned to overlap the tap continuously to advance the workpieces onto the tap, means to laterally adjust the symmetrical laterally opposed workpiece gripping means and the advancement means incorporated within the workpiece gripping means relative to the shank end tap, the gripping and advancement means being of modular construction in a single removable interchangeable unit, means to rotate the advancement means within the gripping means, and a sleeve positioned about a straight length portion of the shank between the tap and the bent end of the shank, the sleeve having an axial cylindrical bore of internal diameter sufficient to accommodate the external dimensions of the workpiece, the end of the sleeve opposite the tap engaged with the tap driver so that the sleeve is rotated in unison with the tap, the sleeve and the portion of the shank inside the cylindrical bore of the sleeve removably positioned and journalled to rotate within an openable encasement, and means to synchronize the rate of rotation of the tap driver with the rate of rotation of the advancement means within the gripping means; a plunger means extending into the slot of the head of the tap driver linearly aligned with the straight length portion of the shank to push the bent end of the shank away from a back wall of the slot.

According to even an additional aspect, a method of cutting threads into an internal bore of a series of objects of corresponding size, each object having an axial bore, includes the steps of inserting a continuous series of objects into a gripping and advancement assembly, aligning the axial bore of each object within the gripping and advancement assembly with a linear axis of a rotating tap, advancing each the object as held and aligned within the gripping means onto and over the tap in a continuous and uninterrupted series.

To the accomplishment of the foregoing and related ends, the invention, then, comprises the features hereinafter fully described in the specification with reference to the drawings and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

In the annexed drawings:

FIG. 1 is a schematic illustration of a bent shank nut tapping machine in accordance with the present invention;

FIG. 2 is a side elevation of the head portion of the bent shank nut tapping machine;

FIG. 3 is a top view of the worm jaw and worm driver assemblies;

FIG. 4 is a rear elevation of the worm jaw assembly looking generally along the direction of arrows 4/5—4/5 in FIG. 3;

FIG. 5 is a rear elevation of the worm driver assembly looking generally along the direction of arrows 4/5—4/5 in FIG. 3;

FIG. 5a is a rear elevation of a single worm driver assembly adapted power two heads;

FIG. 10a is a side elevation of the inward facing side of a worm jaw assembly;

FIG. 10b is a cross-section of a side elevation of a worm jaw assembly taken parallel to the axis of worm shaft 49;

FIG. 10c is a bottom view of a worm jaw assembly;

FIG. 10d is a top view of a worm jaw assembly;

FIG. 10e is a cross-section looking generally along the direction of arrows 10e—10e in FIG. 10a;

FIG. 10f is a cross-section looking generally along the direction of arrows 10f—10f in FIG. 10a;

FIG. 10g is a cross-section looking generally along the direction of arrows 10g—10g in FIG. 10a;

FIGS. 16a-16b are end and side elevation views, respectively, of the sleeve;

FIGS. 17a-17b are top and side views, respectively, of the shank sleeve, and tap driver head in the assembled position;

FIGS. 18a-18c are top, side, and end views, respectively, of the tap driver head.

DETAILED DESCRIPTION OF THE INVENTION

Figure 6A:
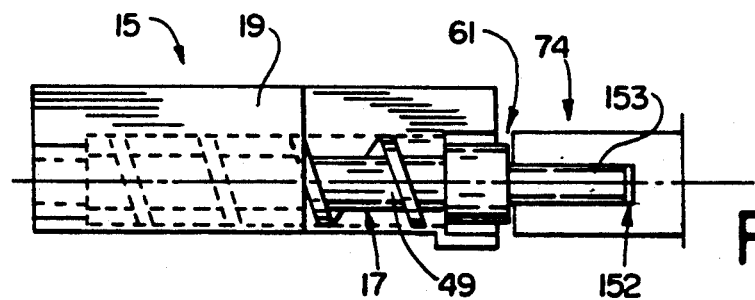
FIGS. 6a through 6c are views of a single jaw assembly.

Referring in detail to the drawings, wherein like reference numerals designate like parts in the several figures, and initially to FIG. 1, there is illustrated a bent shank nut tapping machine indicated generally at 1. The machine 1 includes a head 2 where nut or other fastener blanks enter the machine and are continuously advanced onto a rotating tap which cuts the threads in nut or fastener blanks as desired. A main drive assembly 3 provides synchronized power to the head 2 as is described below, and a support stand 4 serves as a base upon which the head 2 and main drive assembly 3 are mounted.

Referring specifically to the head 2, included is a tap 6 which is attached to the distal end of a tap shank 7. The straight length portion of tap shank 7 is encompassed by a hinged shank sleeve encasement assembly 9 which supports a sleeve 8. The tap shank 7 terminates in a bent end 10 which is positioned within a slot 11 formed in tap driver head 16 of tap driver 12. A driver end 13 of sleeve 8 is also engaged by the tap driver head 16 of the tap driver 12 to rotate in unison with the shank and tap. During operation, the slot 11 in tap driver head 16 of tap driver 12 rotates and, in turn, the tap shank 7 and sleeve 8 are rotated about the longitudinal axis of the shank 7.

The head 2 also includes a worm jaw assembly 15 which operates as an advancement mechanism to continuously advance nut or fastener blanks onto and across the rotating tap 6 and shank 7. The worm jaw assembly 15 includes two laterally horizontally opposed worms 17 journalled to rotate within worm jaws 19 which are in parallel alignment with and on opposite lateral sides of the length of shank 7 and tap 6 to form a tapping channel in which the fastener blanks are held and advanced. The worms 17 are counter-rotated along their respective longitudinal axes by a worm driver assembly 18. Nut or fastener blanks are fed and guided by a chute 20 into and between jaws 19 and advanced by worms 17 through jaws 19 towards and onto rotating tap 6. A portion of the teeth of the worms 17 which extend beyond the interior lateral walls of opposing jaws 19 into the tapping channel defined by opposing jaws 19 engage laterally opposite sides or corners of fasteners inserted into the channel and urge the fasteners towards and onto tap 6. The chute 20 feeds and aligns a continuous stream of fastener blanks into the tapping channel between the jaws 19 as described in greater detail below. As each fastener blank is advanced towards the tap 6, a subsequent fastener blank from the chute 20 drops into the channel and is advanced by the next series of opposing worm teeth. As a result, fastener blanks are continuously fed and advanced onto the tap without any periodic pauses or interruptions between fasteners.

Upon exiting the laterally opposed worm jaw assemblies 15, moving toward the hinged shank sleeve encasement assembly 19, the exiting fasteners continue to be urged further along the shank 7 towards the bent end 10 by succeeding fasteners, into hinged shank sleeve encasement assembly 9 which supports a sleeve 8 having a cylindrical bore of sufficient clearance for the fasteners to proceed through sleeve 8 to the bent end 10 of the shank through the sleeve. As the threaded fasteners arrive at the bent end 10 of the shank, they exit through slot 11 in the tap driver head 16 and discharged from the bent end 10 into a receptacle 22 or other receiving system.

The worms 17 are held in exact parallel alignment on opposite sides of the tap shank 7 parallel to the longitudinal axis of the shank 7 by the jaws 19. The width of the tapping channel between the jaws 19 is laterally adjustable by an adjustable sliding block system 23. Such adjustment enables the machine to accommodate fastener blanks of different sizes and shapes. Furthermore, it will be appreciated that each worm jaw assembly 15 may be constructed as a single modular unit. Each worm 17 and jaw 19 is constructed as a single worm jaw assembly 15 to allow removal and exchange without manual and visual realignment of the worm and jaw separately as was necessary in the past. As a result, each worm jaw assembly 15 is readily changeable and interchangeable to accommodate fasteners of different sizes and shapes without incurring the production down time associated with having to realign the worms and jaws.

It is to be appreciated that the present invention also contemplates an embodiment wherein two or more heads 2 are run simultaneously in tandem by a common drive assembly as illustrated and described with later reference to FIG. 5a.

Referring briefly to the main drive assembly 3, the assembly 3 includes a tap driver motor 30 which rotationally drives the tap driver assembly 12 to rotate the tap 6. More specifically, the tap driver motor 30 has an output shaft 31 which is coupled via a coupler 32 to a torque transducer 33. The output of the torque transducer 33 is coupled via coupler 34 to a shaft assembly 35 which has an output shaft 36 and bearings arrangement to support such shaft. The output shaft 36 is attached to a pulley wheel 37 which is coupled by a belt 38 to a pulley 39 in the tap driver assembly 12. The pulley 39 is secured to one end of a shaft 40 (shown partially in dotted line) in the tap driver assembly 12. The other end of the shaft 40 is fixedly secured to a tap driver head 16 such that when the shaft 40 rotates the tap driver head 16 also rotates. Alternatively, the tap driver assembly 12 can be powered by a direct drive link, or a chain or gear driver power train.

The tap driver shaft 40 is aligned with the longitudinal axis of the tap shank 7 and is secured in journalled relation at one end by a bearing support 43 and by a bearing assembly 44 positioned adjacent to the tap driver head 16. During operation, with the bent end 10 of the shank 7 in slot 11 of the tap driver head 16, and the driver end 13 of sleeve 8 also engaged by the tap driver head 16, the tap driver motor 30 rotates the belt 38 which rotates the shaft 40 and, as a result, causes the tap driver head 16 to rotate. The slot 11 in the tap driver head 16 rotates and as a result and exerts a rotational force on the bend end 10 of the shank 7, thereby causing the shank 7 and tap 6 to rotate and the sleeve 8 to rotate in unison as described below in greater detail and illustrated in FIGS. 18a and 18b.

The main drive assembly 3 also includes means for powered counter-rotation of the worm shafts 49 of worms 17 inside jaws 19. A worm drive motor 50 shown from the side, has an output shaft 51 to which is attached a pulley or sprocket 52. A belt or chain 59 extends from sprocket 52 to sprocket 53 attached to an end of worm drive shaft 54 positioned perpendicular to and above worm shafts 49. Worm drive shaft 54 is rotated about its linear axis by rotation of worm driver motor 50 by the described drive train. As illustrated with later references to FIG. 5, symmetrical sets of worm teeth 55a and 55b are provided about the periphery of worm drive shaft 54 at the point of intersection of worm shafts 49a and 49b respectively. As shown in FIG. 5, the distal ends of worm shafts 49a and 49b are provided with rotary gears 60, the teeth of which are transversely engaged with worm teeth 55a and 55b of worm drive shaft 54 as is illustrated and described in greater detail below.

As illustrated in rear elevation in FIG. 5a, by extension of worm drive shaft 54 and addition of another symmetrical set of worm teeth 55c and 55d, identical to worms 55a and 55b, a single worm drive shaft 54 provides powered rotation of worms 17 in an identical head 2 arranged in tandem in this embodiment of the invention.

As will be appreciated, the rotational speed of the worms 17 determines the speed at which the fastener blanks advance toward the rotating tap 6. Moreover, the rotational speed of the tap 6 relative to the rate at which the fastener blanks are advanced toward and across the rotating tap 6 determines the pitch of the threads which are cut into a nut blank. In the preferred embodiment, the main drive assembly 3 includes a dual motor control circuit 70 used to control the speed of the tap driver motor 30 and the worm drive motor 50 in order to provide synchronized control of both the rate of rotation of the worms and the rate of rotation of the tap in order to precisely control the pitch of the threads cut into the fasteners. A timing belt pulley 41 is provided on the shaft 40 for use in a conventional manner to generate an electrical signal on line 73 representative of the rotational speed of the rotating tap 6. A conventional sensor such as a magnetic pick-up in worm gear motor 50 provides an electrical signal on line 75 which represents the speed of the worm gear motor 50 and, as will be appreciated, the rotational speed of the worms 17.

The respective signals on lines 73 and 75 are input to a dual motor control circuit 70 where the respective speeds are compared. Based on such comparisons, the dual motor control circuit 70 adjusts the relative speeds of the motors to a predetermined ratio to match the rotational speed of the worms with the rotational speed of the tap to well known pre-set standards to achieve the desired thread pitch. More specifically, the dual motor control circuit 70 controls the speed of the respective motors by way of control lines 76 and 77. The control circuit 70 adjusts the speed of one or both of the motors relative to the other by way of control lines 76 and 77 as necessary in order to maintain the desired pitch. Any number of standard preselected speed/pitch settings can be input into the control circuit 70 by way of an input device 80 such as a potentiometer, switch network, etc. as is conventional in motor control. An exemplary motor control circuit 70 for performing such function is available commercially from OMRON as Model No. C40K.

The motors 30 and 50 in the exemplary embodiment are AC motors, although it will be appreciated that DC motors, servo motors, or stepping motors or a combination of AC and DC motors can also be employed. Furthermore, while the exemplary embodiment utilizes a system of belts, pulleys, chains and sprockets for providing rotational energy to the head 2, it will be appreciated that other means and/or configurations, such as a direct gear system, may be used for rotating the worms 17 and tap 6 without departing from the scope of the invention.

Also shown in FIG. 1, the support stand 4 preferably includes a coolant tank 82. The coolant tank 82 can be used to store cutting oil which is typically used during tapping operations. As is conventional, a pump (not shown) delivers cutting oil from the coolant tank 82 to the rotating tap 6. The cutting oil is then drained from the head 2 of the machine and returns to the coolant tank where it is filtered and oftentimes recirculated.

Referring now to FIG. 2, there is shown an enlarged view of the head 2 showing the tap driver assembly 12 and the inboard lateral side of one worm jaw assembly 15, the symmetrical laterally opposed worm jaw assembly not shown, but being generally similar. Tap driver head 16 is shown attached to the end of tap driver shaft 40. The tap driver shaft 40 is supported by bearing assembly 44. As the tap driver head 16 rotates, the walls of the slot 11 exert a torquing force on the bent end 10 of shank 7 causing it to rotate about its longitudinal axis.

Within the hinged shank sleeve encasement assembly 9 is a sleeve 8 having a bore 88 through which the shank 7 passes. The internal diameter of the bore 88 is dimensioned slightly larger than the outer dimension of the fasteners which pass along the shank 7 and through bore 88 of sleeve 8. The threaded fasteners travel along the length of shank 7 through bore 88 of sleeve 8 and through slot 11 before falling off the bent end 10 of the shank 7 into a receptacle. The sleeve 8 is rotatably supported by support rollers 91 shown in axial profile mounted within the hinged shank sleeve encasement assembly 9 as described with later references to FIG. 5. Drive end 13 of sleeve 8 includes a pair of flats 25 which are inserted into a sleeve driver slot 26 in the face of the tap driver head 16 as described in greater detail below with reference to FIGS. 18a-18b. When the tap driver head 16 rotates, the sleeve 8 is thereby rotated in unison with the shank 7. This arrangement allows the sleeve 8, shank 7, and the threaded fasteners passing over the shank 7 and within the sleeve 8 to rotate in unison to eliminate any friction therebetween.

With reference to FIG. 2, FIG. 3 and FIG. 4, the preferred embodiment of the present invention utilizes an adjustable sliding block system 23 to effect lateral adjustment of the spacing between the laterally opposed worm jaw assemblies 15 relative to the shank 7. As shown in FIG. 4, the worm jaw assemblies 15 are mounted upon worm jaw blocks 115 which rest upon sliding blocks 117. The adjustable sliding block system 23 includes a pair of gibs 107 shown in FIG. 2, fixedly secured to mounting plate 105. The gibs 107 form a guide which is perpendicular to the longitudinal axis of shank 7 and the axis of rotation of the worms 17. Each worm jaw block 115 is fixedly secured to a laterally adjustable sliding block 117 which fits within gibs 107. The block 117 includes one or more legs 118 which overlap gibs 107 such that the block 117 is laterally movably secured by the gibs 107 and can move only in a lateral direction perpendicular relative to the shank 7. The width of the tapping channel 127 defined by opposing jaws 19 can thereby be adjusted laterally while maintaining exact parallel alignment of worms 17 with the axis of shank 7.

Referring to FIG. 4, an elevation of the forward end of the laterally opposed worm jaw assembly 15 looking generally in the direction of the arrows 4—4 in FIG. 3 is shown. Each worm jaw assembly 15 is removably secured to and aligned within a respective block 115 such that the worm 17 and jaw 19 are always in parallel alignment with the axis of the straight length portion of tapping shank 7. Therefore, when one worm and jaw assembly is replaced by another, it is not necessary to visually and manually realign the jaws with the tap shank 7 to achieve accurate tapping results. The worm jaw assemblies 15a and 15b are shown closely laterally spaced to define a tapping channel 127 wherein a fastener blank 126 is held by jaw members 19a and 19b and advanced through the tapping channel 127 by forward counter-rotation of worms 17a and 17b. Worm jaw assemblies 15a and 15b are mounted upon symmetrical jaw blocks 115a and 115b. As shown from above in FIG. 3, each jaw 19 is provided with a removable securing bolts 116 through the body of jaw 19 which extends into jaw block 115 for removable and accurate securement of the worm jaw assembly 15.

As shown in FIG. 3 and FIG. 4, a threaded lead screw 162 is threaded through sliding block 117b and reverse threaded through sliding block 177a to draw or push the sliding blocks away or toward the tap center line of tapping channel 127 to provide single step lateral screw adjustment of the worm jaw assemblies 15a and 15b within the lateral adjustment assembly 23. A handle 163 is attached to the end of lead screw 162 to facilitate precision manual adjustment.

The manner in which the worms 17 are counter-rotated within opposing jaws 19 is now described with reference to FIG. 3 and FIG. 5. FIG. 3 illustrates a partial top view of the symmetrical laterally opposed worm jaw assemblies 15 and the worm drive mechanism indicated generally at 18. As previously noted, each worm jaw assembly 15 includes two symmetric laterally opposed worms 17 each rotatably mounted within a jaw 19. As the worms 17 rotate within jaws 19, fastener blanks inserted between and held by the jaws are advanced through a tapping channel 127 defined by the opposing worm jaws 19 toward and onto rotating tap 6. The tip of the tap 6 is positioned at the approximate midpoint of the length of the jaws 19 as shown. Each worm 17 is comprised of a worm shaft 49 with helical worm teeth 129 extending radially and helically from the periphery of the worm shaft 49.

Each worm shaft 49 is rotated within jaw 19 by transverse engagement with a worm drive shaft 54. Worm drive shaft 54 is positioned perpendicular to worm shafts 49 and passes over worm shafts 49 as shown in FIG. 5. Worm drive shaft 54 is supported by bearing supports 68 and 69 which are held within vertical support walls 70 and 71 at opposite sides of mounting plate 105. About the mid-section of the periphery of worm drive shaft 54 are provided symmetrical worms 55a and 55b which engage rotary gears 60 at the distal ends of worm shafts 49. Thus, as the worm drive shaft 54 is rotated, worms 55a and 55b induce counter-rotation of rotary gears 66 to counter-rotate worm shafts 49 and worms 17 within the respective jaws 19. Upon lateral adjustment of the worm jaw assemblies 15, rotary gears 60 at the ends of worm shafts 49 simply rotate in engagement to a new position under worms 55a and 55b of worm drive shaft 54. Thus, no lateral adjustment of the worms 55a and 55b along the length of worm drive shaft 54 is necessary. Also, no adjustment of the worm drive assembly 18 is required upon lateral adjustment of the worm jaw assembly 15.

Figure 6B:
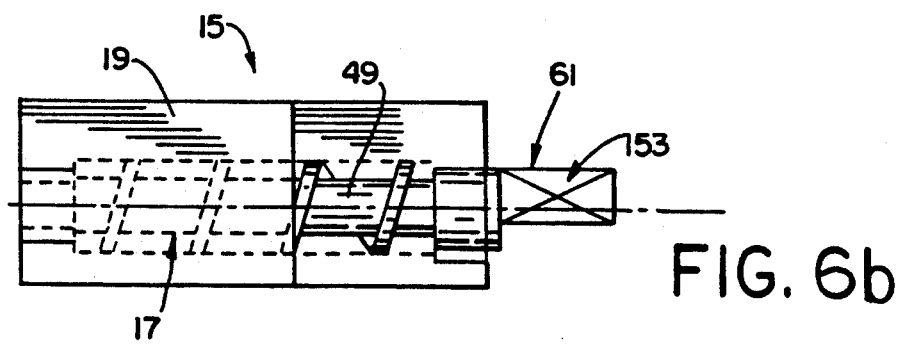
Figure 6C:
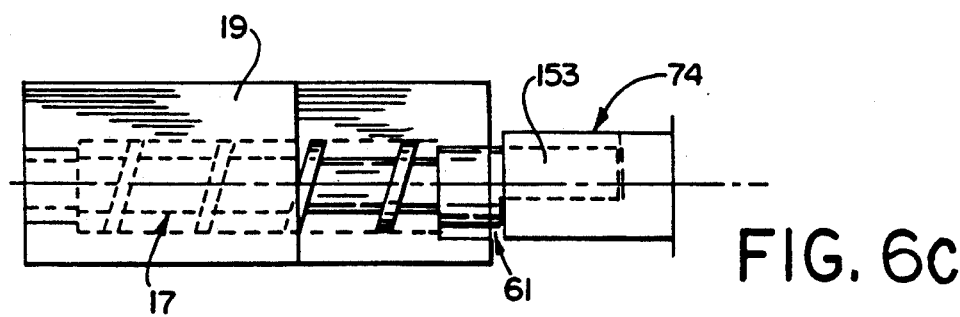

To facilitate easy engagement, disengagement, removal and exchange of the worm jaw assemblies 15 from the worm driver mechanism, a linear coupling 74 along the length of each worm shaft 49 between the jaw 19 and the worm drive shaft 54 is provided, as shown in FIG. 3 and in greater detail in FIG. 6. FIG. 6 illustrates the manner in which the driver end 61 of the worm shaft 49 engages removably with the worm driver assembly 18. A slot 152 in the distal end of worm shaft 49 receives flats 153 on driver end 61 of the worm shaft 49. With slot 152 facing up in a vertical position, i.e., the position illustrated in FIG. 6a when looking down from directly above the worm jaw assembly 15, the driver end 61 of the worm shaft 49 can be lifted vertically out of engagement with the remaining fixed portion of worm shaft 49 which extends under worm drive shaft 54. As shown in FIG. 3, worm drive shaft 54 support walls 70 and 71 are mounted upon mounting plate 105 in front of worm drive shaft 54. Bearing assemblies 68 and 69 are provided within the worm drive shaft support walls.

Figure 7:
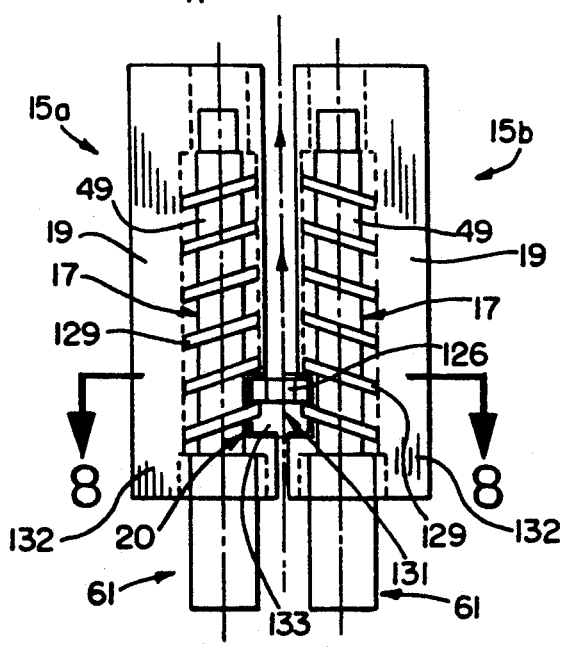
FIG. 7 is an enlarged top view of symmetrical laterally opposed worm jaw assemblies.
Figure 8:
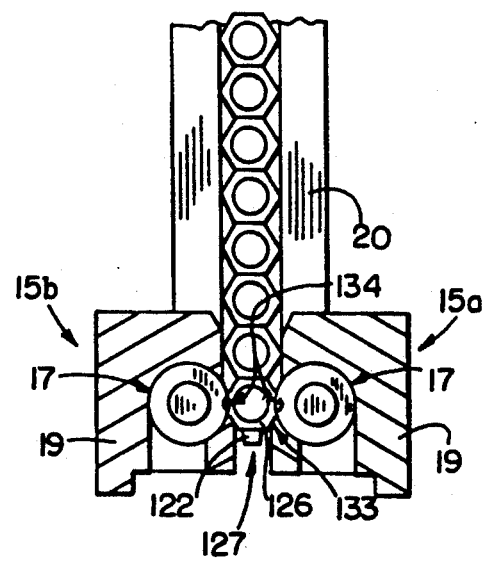
FIG. 8 is a cross-section looking generally along the direction of arrows 8—8 in FIG. 7.
Figure 9:
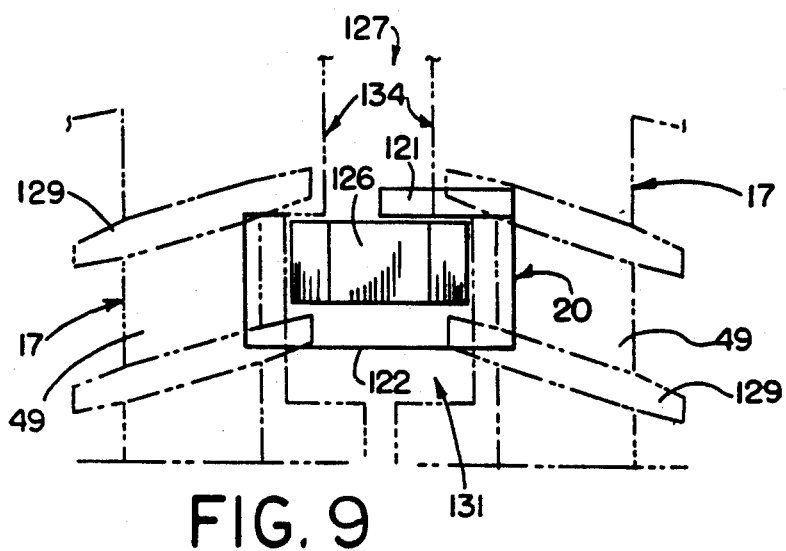
FIG. 9 is an enlarged top view of the insertion slot portion of the symmetrical laterally opposed worm jaw assemblies.

With reference to FIG. 7, FIG. 8, and FIG. 9, it can be seen how a single fastener blank 126 is inserted between the laterally opposed worm jaw assemblies 15a and 15b and each cycle of the worm teeth 129 by gravity feed from chute 20 positioned vertically over fastener blank insertion slot 131. The first fastener blank of series of vertically stacked blanks falls from chute 20 through insertion slot 131 to rest upon the bottom surface 133 of opposing jaw notches 134. Successive fastener blanks stacked vertically in the chute 20 rest upon the blank which has entered the jaws 19. As the worms 17 counter-rotate to produce forward helical motion of the worm teeth 129, the fastener blank 126 which has entered the jaws is advanced forward, along tapping channel 127 in the direction indicated in FIG. 7, along jaw notches 134 through tapping channel 127 and pushed by contact of worm teeth 129 with the edges of the rear face of the blank 126. As the blank 126 progresses forward beyond insertion slot 131, a subsequent fastener blank falls through the insertion slot into jaw notches 134 and between the space between subsequent worm teeth 129.

With reference to FIG. 7, an enlargement of the top view of the worm jaw assemblies 15 shown in FIG. 3, a fastener blank insertion slot 131 is provided at the top of the aft end 132 of each jaw 19 through which the fastener blanks 126 are inserted or dropped from chute 20 to rest upon the bottom surface 133 of jaw notch 134. Jaw notch 134 is shaped to conform to the outward edges of the object to be tapped to accommodate a wide variety of fastener blank configurations as will be appreciated. As shown in FIG. 9, worm teeth 129 protrude radially inward into jaw notch 134 to an extent where the teeth 129 engage the outermost edges of the blanks 126 and exert a forward directed force on the blanks 126 at surface 135 as the worms rotate to advance blanks 126 along tapping channel 127. A rear wall 122 of chute 20 extends down into the tapping channel 127 to prevent the inserted fasteners from falling backward before being urged forward by worm teeth 129.

FIG. 9 is an enlarged top view of the insertion slot 131 in the laterally opposed worm jaw assemblies 15 with a fastener blank 126 inserted in the slot. The chute 20 includes a front piece 121 which terminates at the top of the jaws 19 and a rear wall 122 which extends down into tapping channel 127 to prevent fastener blanks from moving backward once they have entered the tapping channel 127.

Reference is now made to FIGS. 10a-10g which illustrate in detail the modular worm jaw assembly 15 which performs the continuous advancement of the nut or fastener blanks onto the tap. It is understood that the following description is of a single worm jaw assembly 15 designed to work in laterally opposed cooperation with a symmetrical worm jaw assembly 15 as shown in FIG..3 and FIG. 4.

Figure 10D:
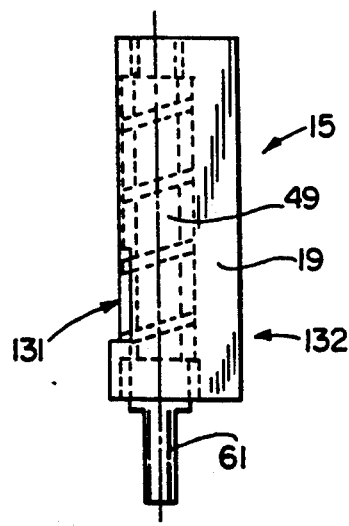
FIGS. 10a through 10g are different views of a single symmetrical half of a worm jaw assembly including.
Figure 10A:
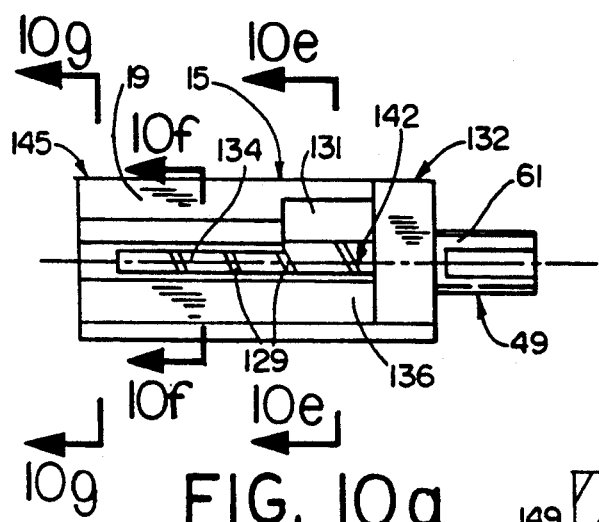

FIG. 10a is a side elevation of the inward-facing wall 136 of a single worm jaw assembly 15 including jaw 19 and worm 17. Jaw notch 134 is shown extending the length of jaw 19 from aft end 132 to forward end 145. Insertion slot 131 is shown extending upward from jaw notch 134 at aft end 132 of jaw 19. Worm teeth 129 extend through jaw notch 134 into tapping channel 127 beyond the inward facing wall 136 of jaw 19 to engage the lateral edge of a nut or fastener blank. Driver end 61 of worm shaft 49 is shown extending from the aft end 132 of the jaw 19.

Figure 10B:
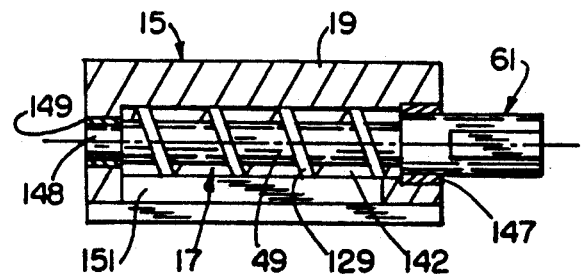

FIG. 10b is a cross-section of a side elevation of the worm jaw assembly 15 shown in FIG. 10a. The worm 17 is held within jaw 19 and journalled to rotate within cylindrical cavity 142 of jaw 19. The internal diameter of cylindrical cavity 142 is sufficient to accommodate worm teeth 129 projecting radially and helically from worm shaft 49. Driver end 61 of the worm shaft 49 rotates upon bearing surface 147 of jaw 19. Distal end 148 of worm shaft 49 is journalled to rotate upon bearing surface 149 of jaw 19. An opening 151 is provided through the bottom of jaw 19 to cylindrical cavity 142.

Figure 10C:
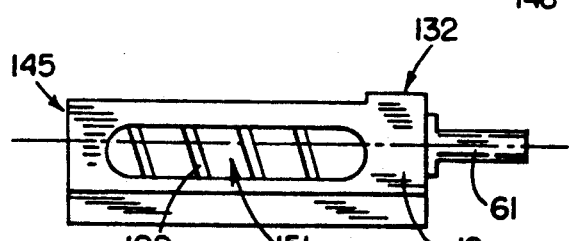

FIG. 10c is a bottom view of jaw 19 showing opening 151 to cylindrical cavity 142. The opening 151 in jaw 19 allows swarf and shavings cut from the threaded nut or fastener blanks to exit the cavity 142 during the tapping operation, carried by circulated cutting oil, to prevent friction and jamming.

FIG. 10d is a top view of the worm jaw assembly 15 showing insertion slot 131 and driver end 61 of worm shaft 49 extending from aft end 132 of jaw 19.

Figure 10E:
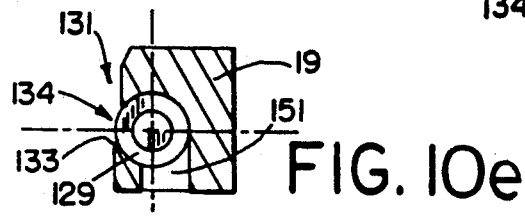
Figure 10F:
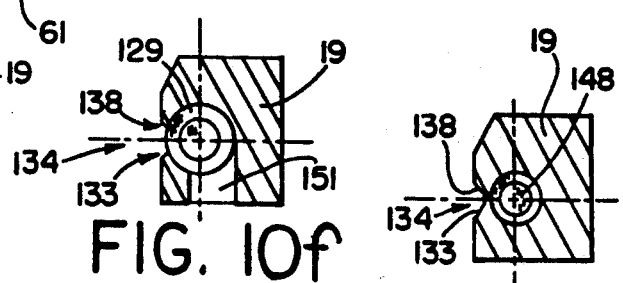
Figure 10G:
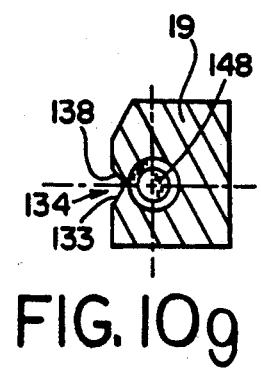

With continuing reference to FIG. 10a and cross-sections of FIGS. 10e, 10f, and 10g taken therefrom, FIG. 10e is a cross-section looking generally in the direction of the arrows 10e—10e in FIG. 10a. The bottom surface 133 of jaw notch 134 is shown at the bottom of insertion slot 131. Blanks enter jaw notch 134 from insertion slot 131 to rest upon the bottom surface 133 of jaw notch 134. Worm teeth 129 are shown extending into jaw notch 134 beyond the inward facing wall 130 of jaw 19 to engage the outermost edges of a nut or fastener blank. FIG. 10f is a cross-section looking generally in the direction of the arrows 10f—10f in FIG. 10a. Jaw notch 134 is at this point comprised of top surface 138 and bottom surface 146. Jaw notch 134 prevents rotation of the nut or fastener blank about the axis of the shank 7 as the blank is advanced along jaw notch 134 in jaw 19 by rotation of the worm teeth 129 toward and on to the rotating tap 6.

FIG. 10g, a cross-section looking generally in the direction of the arrows 10g—10g of FIG. 10a, illustrates how jaw notch 134 is no longer overlapped by worm teeth 129 at the forward end 145 of the jaw 19. At this point in the jaw the tapped fasteners are held in jaw notch 134, about the tap shank, by bottom surface 133 and top surface 138 of notch 134. Eventually, the fasteners are pushed out of the notch 134 to pass out of engagement in notch 134, further along the length of the shank toward bent end 10 by the progression of successive fasteners.

Figure 11A:
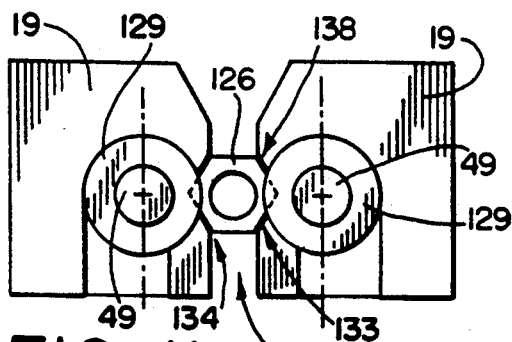
FIGS. 11a through 11g are front elevations of various configurations of symmetrical laterally opposed worm jaw assemblies.

As illustrated in FIGS. 11a through 11h, it will be appreciated that the actual shape of the jaw notch 134 as defined by the bottom surface 133 and top surface 138, or their equivalents, may be configured to match the external shape of any type of axial bore threaded fastener. FIG. 11a is an end view of symmetrical laterally opposed worm jaw assemblies 15 with a six-sided nut blank 126 held by opposing jaw notches 134 in tapping channel 127. It will be appreciated that six-sided nuts of all sizes can be accommodated by jaw notches of this size and configuration.

Figure 11B:
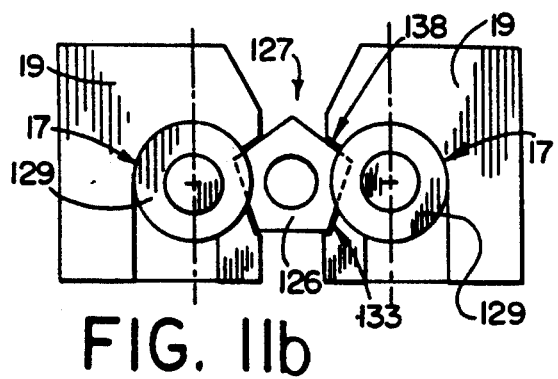

FIG. 11b is a similar end view of symmetrical laterally opposed worm jaw assemblies 15 with a modified jaw notch 134 adapted to accommodate a five-sided nut blank.

Figure 11C:
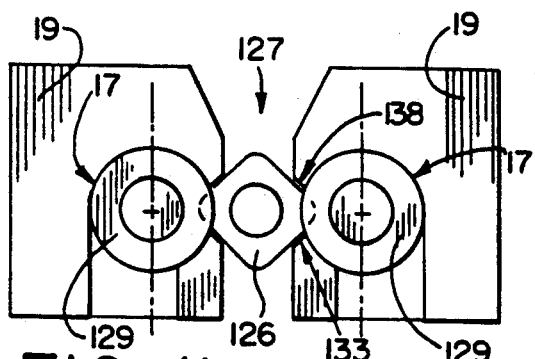

FIG. 11c is another end view of symmetrical laterally opposed worm jaw assemblies 15 with a modified jaw notch 134 having a rounded notch apex to accommodate four-sided nuts having rounded corners.

Figure 11D:
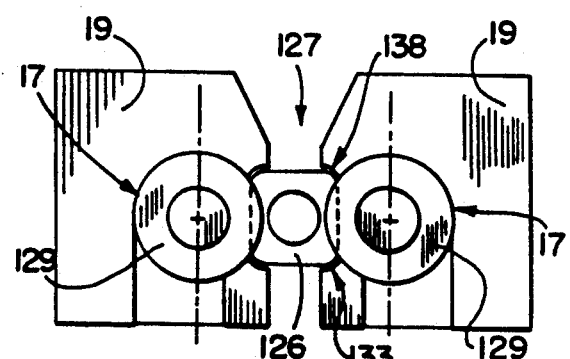

FIG. 11d is an end view of symmetrical laterally opposed worm jaw assemblies 15 with a jaw notch 134 having a one-half rounded rectangular cross-section to advance square nuts by contact of the worm teeth 129 with the sides of the nut rather than by the corners.

Figure 11E:
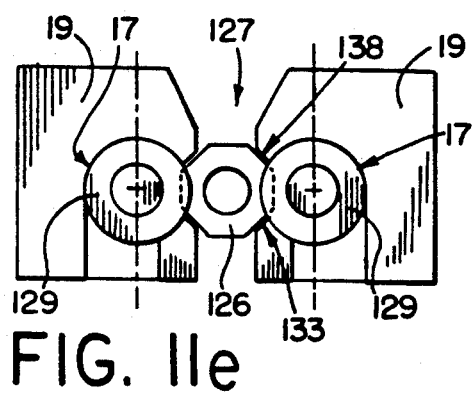

FIG. 11e is another end view of symmetrical laterally opposed worm jaw assemblies with a modified jaw notch 134 to accommodate eight-sided nuts.

Figure 11F:
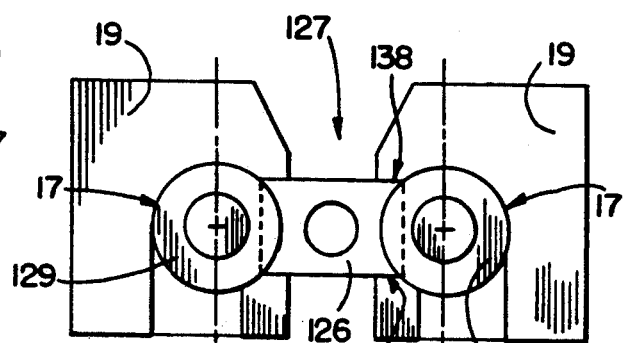

FIG. 11f illustrates an end view of symmetrical laterally opposed worm jaw assemblies 15 spread slightly apart to accommodate a nut or fastener having extra width wherein the outer vertical edges of a rectangular fastener are farther from the axial bore than the horizontal outer edges.

Figure 11G:
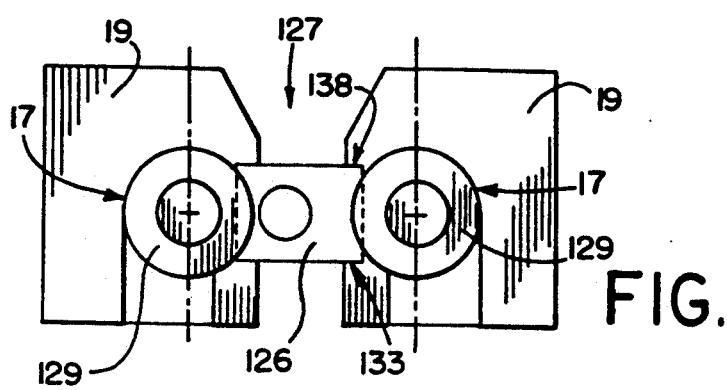

FIG. 11g illustrates a fastener blank 126 wherein the axial bore of the blank is offset from the center of the blank. By simply laterally offsetting one of the opposing jaws 19 from the center line of the tapping channel, such offset fasteners can be readily accommodated and tapped by the present invention.

Figure 12:
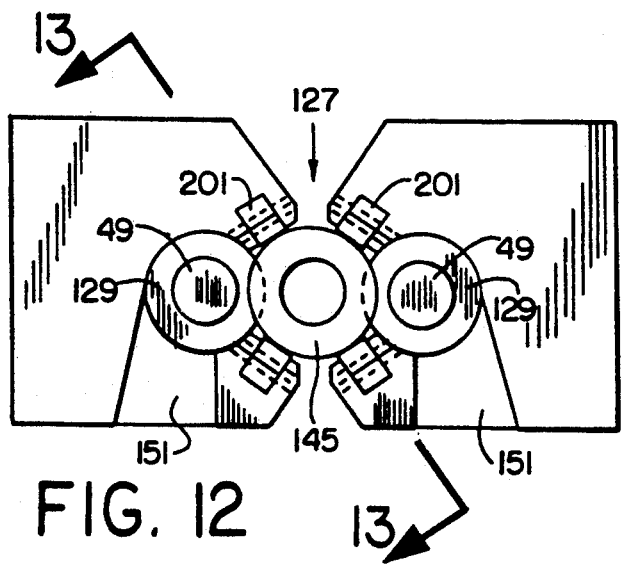
FIG. 12 is a front elevation view of symmetrical laterally opposed worm jaw assemblies adapted for application to round fasteners.
Figure 13:
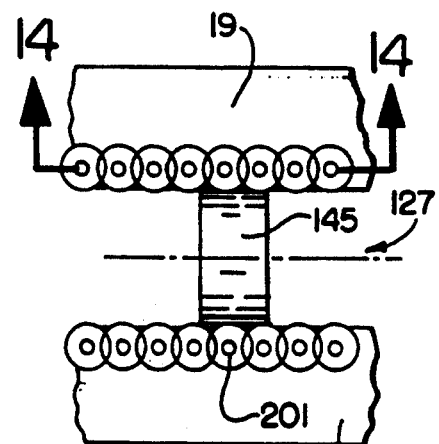
FIG. 13 is a cross-section looking generally along the direction of arrows 13—13 in FIG. 12.
Figure 14:
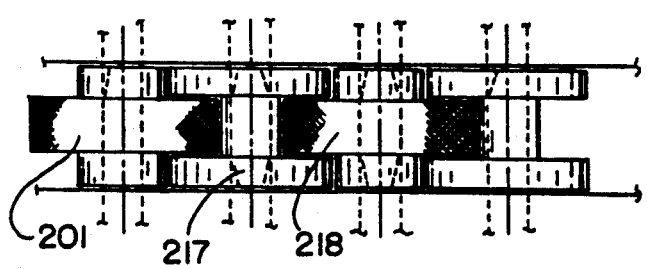
FIG. 14 is an enlarged cross-section view looking generally along the direction of arrows 14—14 in FIG. 13.

As illustrated in FIGS. 12, 13 and 14, it is also possible to tap nuts or fasteners having a round-shaped exterior. As shown in FIG. 12, a round fastener blank 145 is held within jaw blocks 19 and overlapped at opposite points by worm teeth 129. The round fastener blank 145 is held in position in tapping channel 126 by transverse support rollers 201 rotationally mounted along jaw notch 134. As shown in FIG. 13, a cross-section looking generally in the direction of the arrows 13—13 in FIG. 12, a series of transversely mounted overlapping support rollers 201 project slightly beyond the edges of jaw notch 134 to extend into tapping channel 127. The passing round fastener is held within the tapping channel and prevented from moving up or down in the channel by support rollers 201. Because rollers 201 are transversely mounted relative to the length of the tapping channel 134, the round nuts are prevented from rotating about the tap 6 and shank 7 by transverse binding friction between the edges of the fastener in direct contact with the edges of the support rollers 201. The tendency of each fastener to rotate in a direction perpendicular to the direction of rotation of the support rollers 201 creates binding friction which prevents the fastener from rotating about its axis.

FIG. 14 is an enlarged cross-section of the series of support rollers 201 looking generally in the direction of the arrows 14—14 of FIG. 13 showing the manner in which the rollers are constructed to overlap one another. This configuration provides the closest possible spacing of the rollers to insure continuous contact with the edges of the round fastener as it progresses along the jaw notch 134. Tapered axle bearings 217 in each support roller 201 allow for small degree of axial play of each roller to promote the binding effect of the contact between the roller and the outer edge of the round fastener. Additionally, the roller contact surfaces 218 which comes in contact with the outer edges of the round fastener may be knurled in any pattern to promote frictional engagement of the roller with the outer surface of the round fastener.

Figure 15:
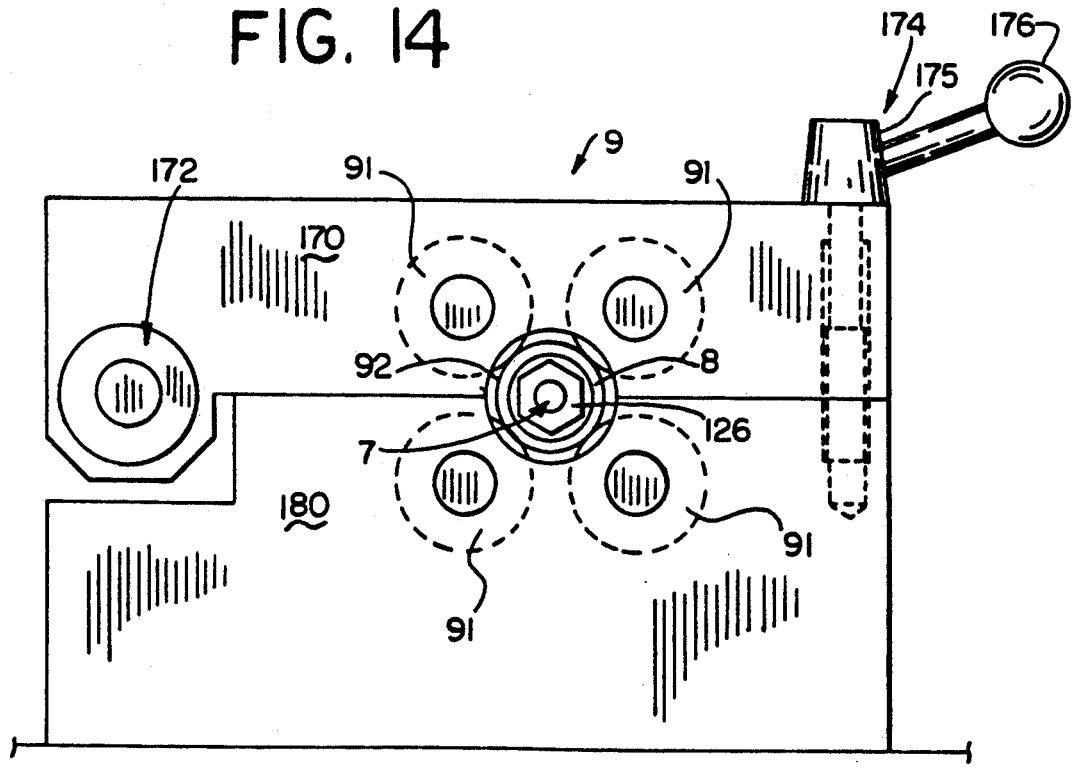
FIG. 15 is a side elevation of the hinged shank sleeve encasement assembly looking generally along the axis of the tap shank.

Referring now to FIG. 15, there is shown in isolation an enlarged side elevation of the hinged shank sleeve encasement assembly 9. The purpose of the hinged shank sleeve assembly 9 is to provide ready access to the shank 7 and sleeve 8 to allow the shank 7 and sleeve 8 to be easily installed and lifted out of the machine at the beginning and end of production runs. At the beginning of production runs, the straight length portion of the shank 7 encompassed by sleeve 8 is loaded with nut or fastener blanks which support the straight length portion of the shank 7. Also, at the end of a production run, the straight length portion of the shank is supporting tapped fasteners which must be removed. The hinged shank sleeve encasement assembly 9 allows the shank 7 with the tapped fasteners about the straight length portion within sleeve 8 easily to be lifted as a single assembly vertically out of engagement with the head 2. Top portion 170 of the hinged shank sleeve assembly 9 includes a transverse hinge pin 172 at the back and a locking pin or screw or latch 174 having pin head 175 and handle 176 inserted through the top portion 170 extending therethrough into bottom portion 180. In the closed and locked position, support bearings 91 are brought into rotational contact with the recessed surfaces 92 of sleeve 8. With the tap driver head 16 of the tap driver 12 (illustrated in FIG. 2) positioned with the opening of slot 11 pointed in the vertical direction, top portion 170 of the hinged shank sleeve assembly is opened about hinge pin 172 to allow direct access to the shank 7 and sleeve 8. The shank 7 and sleeve 8 can be easily lifted vertically out of the shank sleeve assembly and tap driver for maintenance or retooling. The driver end 13 of sleeve 8 is removable sleeve drive slot 26 in the forward face of top head member 41 with tap driver slot 11 positioned vertically, as described in greater detail with reference to FIG. 17.

Referring now to FIGS. 16a and 16b, the driver end 13 of the sleeve 8 is illustrated in end and side elevations, respectively. Flats 25 are provided on the driver end 13 for insertion into a matching sleeve driver slot 26 in tap driver head 16 whereby the sleeve 8 is engaged with the tap driver head 16 for uniform rotation with the shank 7. The sleeve 8 also includes radially recessed surfaces 92 which receive support rollers 91, shown in FIG. 15, as mounted within the hinged shank sleeve encasement assembly 9, to support and prevent axial movement of the sleeve when the hinged encasement assembly 9 is in the closed condition. Additional offsets along the sleeve with corresponding support rollers may be provided. The outline of cylindrical axial bore 88 in sleeve 8 is also shown in FIG. 16b.

FIG. 17a and 17b illustrate the shank 7 and sleeve 8 as installed in operation in engagement with tap driver head 16. FIG. 17a is an isolated view from above of the shank sleeve and tap driver showing the driver end 13 of sleeve 8 inserted into sleeve driver slot 26. The bent end 10 of the shank 7 can be seen extending from the driver end 13 of the sleeve 8 into slot 11 in tap driver head 16. FIG. 17b is a side view of the shank sleeve driver assembly which illustrates the curvature of the bend end 10 of the shank 7 through slot 11 in tap driver head 16.

With reference to FIGS. 18a-18c, top, side, and end views of the tap driver head 16 respectively, the sleeve driver slot 26 in the front face 213 of tap driver head 16 are shown. As shown from above in FIG. 18a, with the sleeve driver slot 26 positioned with the slot opening pointed vertically, the sleeve can be easily lifted vertically out of engagement with the tap driver head 16. The sleeve driver slot 26 is in vertical alignment with slot 11 to allow the shank and sleeve to be installed and removed in unison.

Also illustrated in FIGS. 18a through 18c is a roller mechanism 210 in slot 11 along the wall of slot 11 with which the tapped fasteners come in contact as they exit the bent end 10 of the shank 7 through slot 11. As the tap driver head 16 rotates in the direction indicated in FIG. 18c, the bent end 10 of the shank 7 comes in direct contact with the top of the interior wall of slot 11 which is pushing or driving the shank. As the tapped fasteners reach the very end of the bent end 10 of the shank, they must pass between the shank and the interior side wall of slot 11 to fall off the end of the shank. To eliminate damaging friction between the exiting fasteners at the tip of the bent end 10 of the shank and the top of the interior side wall of the slot 11, roller 210 is provided at the exit point of the slot 11 as shown. As shown in FIGS. 18a and 18b, a shaft 212 extends from the face 213 of the tap driver head 16, along the length of slot 11, to the rear portion of the tap driver head 16. One or more free spinning cylindrical bearings 214 are supported by shaft 212.

Figure 19:
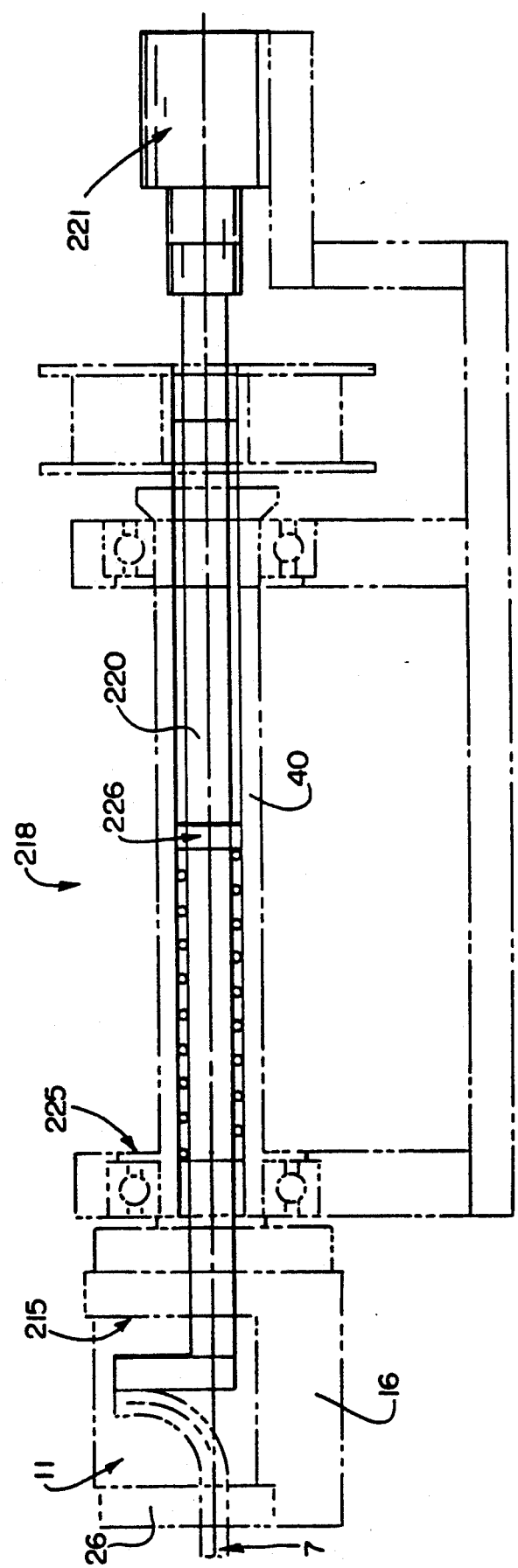
FIG. 19 is a side elevation of the tap positioning plunger assembly.

FIG. 19 illustrates from the side a shank positioning plunger assembly indicated generally at 218. As the tapping operation is commenced, forward pressure on the tap 6 pushes the bent end 10 of the shank 7 to the back wall 215 of slot 11 in tap driver head 16. Direct contact of the bent end 10 of the shank 7 with the back wall 215 of slot 11 in tap driver head 16 impedes the exit of fasteners from the bent end 10 of the shank. When the bent end 10 of the shank is positioned in the middle of slot 11 as shown in FIG. 19, the exiting fasteners need only come in contact with the roller 210 (not shown) in interior side wall of slot 11 as described above. To position the bent end 10 of the shank at the midpoint of slot 11, as shown in FIG. 19, a plunger 220 is positioned in axial alignment with the tap driver shaft 40 to extend into slot 11 of tap driver head 16 to push the shank 7 forward away from the back wall 215 of slot 11. A linear actuator 221 is provided at the rearward end of plunger 220 to push the plunger forward into slot 11. A spring 222 is provided about the plunger 220 between support bearing 225 and a shoulder 226 to retract the plunger after it has been moved forward by the linear actuator. Once the shank has been moved into the central position as shown, it remains in this position inside slot 11, spaced from back wall 215, by counteracting the force of the fastener advancement worms on tap 6 with the screwing action into the fastener blank. Alternatively, the plunger 220 can be manually operated.

Alternatively, it is to be noted that the shank can be positioned in the middle of slot 11 without the use of a plunger by separate adjustment of either the tap driver motor or the worm driver motor. As the tapping operation is commenced, the bent end 10 of shank 7 is pushed against back wall 215 of slot 11 in tap driver head 16. To draw the bent end 10 of shank 7 away from the back wall 215 of slot 11, the rate of rotation of worms 17 can be slightly reduced in which case the tap 6 will screw the shank 7 forward in the direction opposite the direction of advancement of the fastener blanks. Alternatively, to position the bent end 10 of the shank 7 away from back wall 215 of slot 11 the rate of rotation of the shank 7 can be slightly increased above the matched rate of rotation of the worms 17 and shank 7, to screw the tap and shank forward into the middle of slot 11.

The means by which the powered rotation of the tap is synchronized and regulated with the powered rotation of the worms is now described with sole reference to FIG. 1. The drive train which provides powered rotation of the tap shank 7 begins with motor 30 mounted upon the lower shelf of support stand 4. A main shaft 31 of the motor extends through shaft coupler into torque transducer 33, with flexible shank coupler 34 at the opposite end of the torque transducer 33. Shaft bearing assembly 35 is adjacent flexible coupler 34 and supports at an opposite end pulley 37.

Torque transducer 33 is provided to sense the load on tap 6 and tap driver assembly 12. As the tap 6 is dulled, the load on tap 6 and the tap driver assembly 12 is increased. The torque transducer 33 senses the increased load and provides a signal to an operator display (not shown) which indicates that the force of the tap is unmatched to the force of the advancing fastener blanks. Similarly, in the event that the tap or shank breaks, the load on the tap driver assembly 12 will immediately drop. The torque transducer will also sense this change in the tap driver assembly load and similarly provide a signal to the operator.

Referring now to the upper shelf of support stand 4 and the components mounted thereon, there is provided mounting plate 43 which supports upper drive shaft 40 between the mounting plate and shaft bearing housing 44. About the shaft between the mounting plate and the bearing housing 44 are mounted drive pulley 39 and timing belt pulley 41. A belt 38 extends from lower pulley 37 to drive pulley 39 to affect powered rotation of shaft 40. The tap driver head 16 is mounted adjacent to shaft bearing assembly 44 for engagement with the bent end of the tap shank 7. The hinged shank sleeve encasement assembly 9 stands adjacent the tap driver 44. The tap shank 7 extends from the hinged shank sleeve encasement assembly 9 to interface with the worm jaw assembly 15.

The drive train which provides powered rotation of the worms 17 within the jaws 19 begins with worm motor 50 from which extends a shaft 51 with a sprocket or pulley 52 attached to the distal end of shaft 51. A chain or pulley 59 extends from sprocket 52 to sprocket 53 attached to an end of worm drive shaft 54 to provide powered rotation of worm drive shaft 54 and worms 17 as described above. An overload clutch 62 may be provided in connection with pulley 53 to cease powered rotation of the worm 17 in the event of a jam. When overload clutch 62 is activated, it sends a signal through a switch to shut off power to the machine.

A drive control, indicated schematically at 160 is provided between the worm gear drive motor and the tap shank drive motor. The drive control 160 provides programmed speed matching of the two motors to accomplish the correct synchronization of the rate at which the tap is spinning with the rate at which the nut or fastener blanks are advanced over the tap by the worm gears. Conventional controls that are commercially available may be used to produce such control functions.

Although the invention has been shown and described with respect to one version of a preferred embodiment, equivalent alterations and modifications of the components and methods of the invention may occur to those skilled in the art upon reading and understanding this specification. The present invention includes all such equivalent alterations and modification, and is limited only by the scope of the following claims.

Industrial Application

It will be appreciated that the invention may be used to tap threads in variety of fasteners.

I claim:

1. A machine for cutting internal threads into an axial bore of a continuous series of workpieces without interruption between workpieces comprising, in combination, a tap axially aligned with and attached to an end of a shank, an opposite end of said shank bent and removably engaged with a tap driver, continuous advancement means parallel and laterally aligned with said tap and incorporated into and journalled to rotate within symmetrical laterally opposed workpiece gripping means, said advancement and gripping means positioned to overlap said tap continuously to advance said workpieces onto said tap and shank, means to rotate said tap drive, and means to rotate said advancement means within said gripping means.

2. The machine as set forth in claim 1 wherein said continuous advancement means incorporated into said gripping means is modularly constructed as a single removable and interchangeable unit.

3. The machine as set forth in claim 2, further comprising means for lateral opposite adjustment of said modular gripping and advancement means.

4. The machine as set forth in claim 1 further comprising a chute positioned to guide said workpieces into positioned between said symmetrical laterally opposed workpiece gripping means.

5. The machine as set forth in claim 1 further comprising means for powered rotation of said shank and said tap.

6. The machine as set forth in claim 1 further comprising means for powered rotation of said advancement means within said gripping means.

7. The machine as set forth in claim 1 further comprising means for powered rotation of said shank and said tap and powered rotation of said advancement means within said gripping means.

8. The machine as set forth in claim 1 further comprising means for synchronizing said advancement power means with said shank power means.

9. The machine as set forth in claim 1 wherein said gripping means include notches which conform to the outer dimensions of and support and prevent rotation of said workpieces as said workpieces are advanced onto said tap.

10. The machine a set forth in claim 1 wherein said advancement means includes worms axially aligned with said shank and journalled to rotate within said gripping means, said worms having helical radially extending teeth which engage said workpiece and urge it toward said tap.

11. A machine for cutting internal threads into an axial bore of a continuous series of workpieces without interruption between workpieces comprising, in combination, a tap axially aligned with and attached to an end of a shank, an opposite end of said shank bent and removably engaged with a tap driver, means to rotate said tap driver, continuous advancement means parallel and laterally aligned with said tap and incorporated into and journalled to rotate within symmetrical laterally opposed workpiece gripping means, said gripping means positioned to overlap said tap continuously to advance said workpieces into said tap, means to rotate said advancement means within said gripping means, and a sleeve positioned about a straight length portion of said shank between said tap and said bent end of said shank, said sleeve having an axial cylindrical bore of the diameter sufficient to accommodate the external dimensions of said workpiece.

12. The machine as set forth in claim 11 wherein the end of said sleeve opposite the tap is engaged with said tap driver so that said sleeve is rotated in unison with said tap.

13. The machine as set forth in claim 12 wherein said sleeve and said shank are removable from said machine as a single unit.

14. A machine for cutting internal threads into an axial bore of a continuous series of workpieces without interruption between workpieces comprising, in combination, a tap axially aligned with and attached to an end of a shank, an opposite end of said shank bent and removably engaged with a tap driver, means to rotate said tap driver, continuous advancement means parallel and laterally aligned with said tap and incorporated into and journalled to rotate within symmetrical laterally opposed workpiece gripping means, said gripping means positioned to overlap said tap continuously to advance said workpieces onto said tap, said gripping and advancement means being of modular construction in a single removable interchangeable unit, means to rotate said advancement means within said gripping means, and a sleeve positioned about a straight length portion of said shank between said tap and said bent end of said shank, said sleeve having an axial cylindrical bore of internal diameter sufficient to accommodate the external dimensions of said workpiece, the end of said sleeve opposite the tap engaged with said tap driver so that said sleeve is rotated in unison with said tap.

15. The machine as set forth in claim 14 wherein said gripping and advancement means of modular construction are held in position by removable fasteners.

16. The machine as set forth in claim 14 wherein said gripping means of said gripping and advancement means includes notches configured to the outer dimensions of the workpieces to be tapped.

17. The machine as set forth in claim 14 wherein said gripping and advancement means of modular construction are interchangeable.

18. A machine for cutting internal threads into an axial bore of a continuous series of workpieces without interruption between workpieces comprising, in combination, a tap axially aligned with and attached to an end of a shank, an opposite end of said shank bent and removably engaged with a tap driver, means to rotate said tap driver, continuous advancement means parallel and laterally aligned with said tap and incorporated into and journalled to rotate within symmetrical laterally opposed workpiece gripping means, said gripping means positioned to overlap said tap continuously to advance said workpieces onto said tap, said gripping and advancement means being of modular construction in a single removable interchangeable unit, means to rotate said advancement means within said gripping means, and a sleeve positioned about a straight length portion of said shank between said tap and said bent end of said shank, said sleeve having an axial cylindrical bore of internal diameter sufficient to accommodate the external dimensions of said workpiece, the end of said sleeve opposite the tap engaged with said tap driver so that said sleeve is rotated in unison with said tap, and means to synchronize the rate of rotation of said tap driver with the rate of rotation of said advancement means within said gripping means.

19. The machine as set forth in claim 18 wherein said means to synchronize the rate of rotation of said tap driver with the rate of rotation of said advancement means is electronically controlled.

20. A machine for cutting internal threads into an axial bore of a continuous series of workpieces without interruption between workpieces comprising, in combination, a tap axially aligned with and attached to an end of a shank, an opposite end of said shank bent and removably engaged with a tap driver, means to rotate said tap driver, continuous advancement means parallel and laterally aligned with said tap and incorporated into and journalled to rotate within symmetrical laterally opposed workpiece gripping means, said gripping means positioned to overlap said tap continuously to advance said workpieces onto said tap, said gripping and advancement means being of modular construction in a single removable interchangeable unit, means to rotate said advancement means within said gripping means, and a sleeve positioned about a straight length portion of said shank between said tap and said bent end of said shank, said sleeve having an axial cylindrical bore of internal diameter sufficient to accommodate the external dimensions of said workpiece, the end of said sleeve opposite the tap engaged with said tap driver so that said sleeve is rotated in unison with said tap, said sleeve and the portion of said shank inside the cylindrical bore of said sleeve removably positioned and journalled to rotate within an operable encasement, and means to synchronize the rate of rotation of said tap driver with the rate of rotation of said advancement means within said gripping means.

21. The machine as set forth in claim 20 wherein said sleeve is housed in a separable encasement.

22. The machine as set forth in claim 21 wherein said encasement has support rollers in contact with the exterior of said sleeve.

23. The machine as set forth in claim 21 wherein said separable encasement is openable to provide direct access to said sleeve and said shank for removal from said tap driver.

24. A machine for cutting internal threads into an axial bore of a continuous series of workpieces without interruption between workpieces comprising, in combination, a tap axially aligned with and attached to an end of a shank, an opposite end of said shank bent and removably engaged with a tap driver, means to rotate said tap driver, continuous advancement means parallel and laterally aligned with said tap and incorporated into and journalled to rotate within symmetrical laterally opposed workpiece gripping means, said gripping means positioned to overlap said tap continuously to advance said workpieces onto said tap, means to laterally adjust said symmetrical laterally opposed workpiece gripping means and said advancement means incorporated within said workpiece gripping means relative to said shank end tap, said gripping and advancement means being of modular construction in a single removable interchangeable unit, means to rotate said advancement means within said gripping means, and a sleeve positioned about a straight length portion of said shank between said tap and said bent end of said shank, said sleeve having an axial cylindrical bore of internal diameter sufficient to accommodate the external dimensions of said workpiece, the end of said sleeve opposite the tap engaged with said tap driver so that said sleeve is rotated in unison with said tap, said sleeve and the portion of said shank inside the cylindrical bore of said sleeve removably positioned and journalled to rotate within an openable encasement, and means to synchronize the rate of rotation of said tap driver with the rate of rotation of said advancement means within said gripping means.

25. The machine as set forth in claim 24 wherein said means to laterally adjust said symmetrical laterally opposed workpiece gripping and advancement means includes a threaded lead screw through a base of said gripping means to effect lateral adjustment of said symmetrical laterally opposed workpiece gripping means.

26. The machine as set forth in claim 24 wherein said means to laterally adjust said symmetrical laterally opposed workpiece gripping and advancement means is fixed in perpendicular alignment to a linear axis of said gripping and advancement means.

27. A machine for cutting internal threads into an axial bore of a continuous series of workpieces without interruption between workpieces comprising, in combination, a tap axially aligned with and attached to an end of a shank, an opposite end of said shank bent and removably engaged in a slot in a head of a tap driver, said slot having roller means at the point of contact of said bent end of said shank with a surface wall of said slot, means to rotate said tap driver, continuous advancement means parallel and laterally aligned with said tap and incorporated into and journalled to rotate within symmetrical laterally opposed workpiece gripping means, said gripping means positioned to overlap said tap continuously to advance said workpieces onto said tap, means to laterally adjust said symmetrical laterally opposed workpiece gripping means and said advancement means incorporated within said workpiece gripping means relative to said shank end tap, said gripping and advancement means being of modular construction in a single removable interchangeable unit, means to rotate said advancement means within said gripping means by a single drive shaft, and a sleeve positioned about a straight length portion of said shank between said tap and said bent end of said shank, said sleeve having an axial cylindrical bore of internal diameter sufficient to accommodate the external dimensions of said workpiece, the end of said sleeve opposite the tap engaged with said tap driver so that said sleeve is rotated in unison with said tap, said sleeve and the portion of said shank inside the cylindrical bore of said sleeve removably positioned and journalled to rotate within an openable encasement, and means to synchronize the rate of rotation of said tap driver with the rate of rotation of said advancement means within said gripping means.

28. The machine as set forth in claim 27 wherein said drive shaft which rotates said advancement means within said gripping means is positioned transverse to a linear axis of rotation of said advancement means.

29. The machine as set forth in claim 27 wherein said drive shaft is extendable beyond a first set of symmetrical laterally opposed workpiece gripping and advancement means to provide rotation to a second set of symmetrical laterally opposed workpiece gripping and advancement means.

30. A machine for cutting internal threads into an axial bore of a continuous series of workpieces without interruption between workpieces comprising, in combination, a tap axially aligned with and attached to an end of a shank, an opposite end of said shank bent and removably engaged in a slot in a head of a tap driver, said slot having roller means at the point of contact of said bent end of said shank with a surface wall of said slot, means to rotate said tap driver, continuous advancement means parallel and laterally aligned with said tap and incorporated into and journalled to rotate within symmetrical laterally opposed workpiece gripping means, said gripping means positioned to overlap said tap continuously to advance said workpieces onto said tap, means to laterally adjust said symmetrical laterally opposed workpiece gripping means and said advancement means incorporated within said workpiece gripping means relative to said shank end tap, said gripping and advancement means being of modular construction in a single removable interchangeable unit, means to rotate said advancement means within said gripping means, and a sleeve positioned about a straight length portion of said shank between said tap and said bent end of said shank, said sleeve having an axial cylindrical bore of internal diameter sufficient to accommodate the external dimensions of said workpiece, the end of said sleeve opposite the tap engaged with said tap driver so that said sleeve is rotated in unison with said tap, said sleeve and the portion of said shank inside the cylindrical bore of said sleeve removably positioned and journalled to rotate within an openable encasement, and means to synchronize the rate of rotation of said tap driver with the rate of rotation of said advancement means within said gripping means; a plunger means extending into said slot of said head of said tap driver linearly aligned with the straight length portion of said shank to push the bent end of said shank away from a back wall of said slot.

31. The machine as set forth in claim 30 wherein said plunger is pushed into said slot of said head of said tap driver by a linear actuator.

32. A method of cutting threads into an internal bore of a series of objects of corresponding size, each object having an axial bore, comprising the steps of:
- inserting a continuous series of objects into a gripping and advancement assembly wherein advancing means are journalled to rotate within laterally opposed workpiece gripping means,
- aligning the axial bore of each object within said gripping and advancement assembly with a linear axis of a rotating tap,
- advancing each said object as held and aligned within said gripping means onto and over said tap in a continuous and uninterrupted series.

33. The method as set forth in claim 32 wherein said objects are advanced within said gripping advancement assembly by urging of teeth of worms incorporated into and journalled within said gripping advancement assembly.

34. The method as set forth in claim 32 further comprising the step of synchronizing a selected rate of rotation of said advancement means within said gripping advancement assembly with a selected the rate of rotation of the tap.

* * * * *